US009874461B2

(12) United States Patent
Ishida et al.

(10) Patent No.: US 9,874,461 B2
(45) Date of Patent: Jan. 23, 2018

(54) APPARATUS FOR ESTIMATING ROTATIONAL POSITION OF PREDETERMINED MAGNETIC POLE OF ROTARY ELECTRIC MACHINE

(71) Applicant: DENSO CORPORATION, Kariya, Aichi-pref. (JP)

(72) Inventors: Jun Ishida, Kariya (JP); Kiyoshi Fujii, Kariya (JP)

(73) Assignee: DENSO CORPORATION, Kariya (JP)

( * ) Notice: Subject to any disclaimer, the term of this patent is extended or adjusted under 35 U.S.C. 154(b) by 142 days.

(21) Appl. No.: 14/887,888

(22) Filed: Oct. 20, 2015

(65) Prior Publication Data

US 2016/0109265 A1    Apr. 21, 2016

(30) Foreign Application Priority Data

Oct. 21, 2014 (JP) ................................. 2014-214865

(51) Int. Cl.
*G01D 5/14* (2006.01)
*G01D 5/20* (2006.01)
*H02P 6/18* (2016.01)
*H02P 21/24* (2016.01)

(52) U.S. Cl.
CPC ............. *G01D 5/208* (2013.01); *H02P 6/183* (2013.01); *H02P 21/24* (2016.02)

(58) Field of Classification Search
CPC ........................................................ G01D 5/14
USPC .............................. 318/400.03, 400.01, 700
See application file for complete search history.

(56) References Cited

U.S. PATENT DOCUMENTS 5,187,417 A * 2/1993 Minnich .................. H02P 6/06
                                                318/400.12
8,324,768 B2 * 12/2012 Nakano ................ G01D 5/2046
                                                 310/156.06
8,698,433 B2 * 4/2014 Green .................. H02P 21/0089
                                                  318/400.01

FOREIGN PATENT DOCUMENTS

JP          3312472 B2    8/2002
JP       2009273254 A    11/2009

* cited by examiner

*Primary Examiner* — David S Luo
(74) *Attorney, Agent, or Firm* — Oliff PLC

(57) ABSTRACT

In an apparatus for controlling a rotary electric machine, a voltage applier applies a high-frequency voltage to one of the field winding and the armature winding. One of a field winding and an armature winding is defined as an input winding, and the other thereof is defined as an output winding. A current detector detects a high-frequency current flowing through the output winding based on the applied high-frequency voltage. The high-frequency current includes therein information associated with the rotational position of a target magnetic pole of the rotor as a predetermined one of the magnetic poles. An estimator estimates the rotational position of the target magnetic pole of the rotor according to the high-frequency current detected by the current detector.

14 Claims, 12 Drawing Sheets

APPARATUS FOR ESTIMATING ROTATIONAL POSITION OF PREDETERMINED MAGNETIC POLE OF ROTARY ELECTRIC MACHINE

CROSS REFERENCE TO RELATED APPLICATIONS

This application is based on and claims the benefit of priority from Japanese Patent Application 2014-214865 filed on Oct. 21, 2014, the disclosure of which is incorporated in its entirety by reference.

TECHNICAL FIELD

The present disclosure relates to apparatuses for estimating the rotational position of a predetermined magnetic pole of a wound-field rotary electric machine.

BACKGROUND

Conventional apparatuses, which estimate the rotational position of a predetermined magnetic pole of a motor having salient pole characteristic as an example of rotary electric machines, have been widely used. One example of these apparatuses, which uses the salient pole characteristic of the rotor, is disclosed in Japanese Patent Publication No. 3312472, referred to as a published patent document.

Note that the rotational position of a predetermined magnetic pole of a motor represents the actual rotational position of the direction of a magnetic field, i.e. a magnetic flux, generated by a predetermined magnetic pole, i.e. an N pole, of the rotor of the motor.

Specifically the apparatus disclosed in the published patent document applies an alternating-current (AC) voltage vector to the motor. This application generates a first current component in a first direction perpendicular to the AC voltage vector and a second current component in a second direction parallel to the AC voltage vector except when the AC voltage vector is perpendicular or parallel to γ axis. The γ axis represents an estimated position of a predetermined magnetic pole of the rotor. The apparatus also measures the first and second current components, and estimates, according to at least one of the measured first and second current components, the actual position of the predetermined magnetic pole of the rotor using the salient pole characteristic of the rotor. Note that the salient pole characteristic of the rotor represents the difference in reluctance between the actual direction of the magnetic field generated by the predetermined magnetic pole and the direction magnetically perpendicular to the actual direction of the magnetic field generated by the predetermined magnetic pole.

SUMMARY

The inventors of the present disclosure has considered applying the magnetic-pole position estimation method disclosed in the published patent document to wound-field motors as an example of wound-field rotary electric machines.

Unfortunately, the inventors have found that applying the magnetic-pole position estimation method to a wound-field motor with a non-salient pole characteristic has a difficulty in estimating the rotational position of a predetermined magnetic pole of the rotor. This is because the magnetic-pole position estimation method necessitates the salient pole characteristic of the rotor. Users for rotary electric machines therefore desire a new magnetic-pole position estimation technology applicable for wound-field rotary electric machines each having a non-salient pole characteristic in addition to wound-field rotary electric machines each having a salient pole characteristic.

In view of the circumstances set forth above, one aspect of the present disclosure seeks to provide a new magnetic-pole position estimation technology applicable for wound-field rotary electric machines each having a non-salient pole characteristic in addition to wound-field rotary electric machines each having a salient pole characteristic.

Specifically, an alternative aspect of the present disclosure aims to put the magnetic-pole position estimation technology into practice.

According to an exemplary aspect of the present disclosure, there is provided an apparatus for controlling a rotary electric machine including a rotor with a field winding for generating at least one pair of magnetic poles, and a stator with an armature winding. The field winding and the armature winding are magnetically coupled to each other when energized. The apparatus includes a voltage applier that applies a high-frequency voltage to one of the field winding and the armature winding. One of the field winding and the armature winding is defined as an input winding, and the other thereof is defined as an output winding. The apparatus includes a current detector that detects a high-frequency current flowing through the output winding based on the applied high-frequency voltage. The high-frequency current includes information associated with the rotational position of a target magnetic pole of the rotor as a predetermined one of the magnetic poles. The apparatus includes an estimator that estimates the rotational position of the target magnetic pole of the rotor according to the high-frequency current detected by the current detector.

The electromagnetic coupling between the field winding and the armature winding when energized enables application of a high-frequency voltage to the input winding as one of the field and armature windings to cause a high-frequency current to flow through the output winding as the other of the field and armature windings. The high-frequency current includes information associated with the rotational position of a target magnetic pole of the rotor as a predetermined one of the magnetic poles. Thus, the estimator estimates the rotational position of the target magnetic pole of the rotor according to the high-frequency current detected by the current detector, i.e. the information included in the high-frequency current.

The exemplary aspect of the present disclosure therefore provides the above new magnetic-pole position estimation technology applicable for wound-field rotary electric machines each having a non-salient pole characteristic in addition to wound-field rotary electric machines each having a salient pole characteristic. In addition, the exemplary aspect of the present disclosure enables the magnetic-pole position estimation technology to be put into practice as the above apparatus.

The above and/or other features, and/or advantages of various aspects of the present disclosure will be further appreciated in view of the following description in conjunction with the accompanying drawings. Various aspects of the present disclosure can include and/or exclude different features, and/or advantages where applicable. In addition, various aspects of the present disclosure can combine one or more feature of other embodiments where applicable. The descriptions of features, and/or advantages of particular embodiments should not be construed as limiting other embodiments or the claims.

BRIEF DESCRIPTION OF THE DRAWINGS

Other aspects of the present disclosure will become apparent from the following description of embodiments with reference to the accompanying drawings in which.

DETAILED DESCRIPTION OF EMBODIMENT

Figure 1:
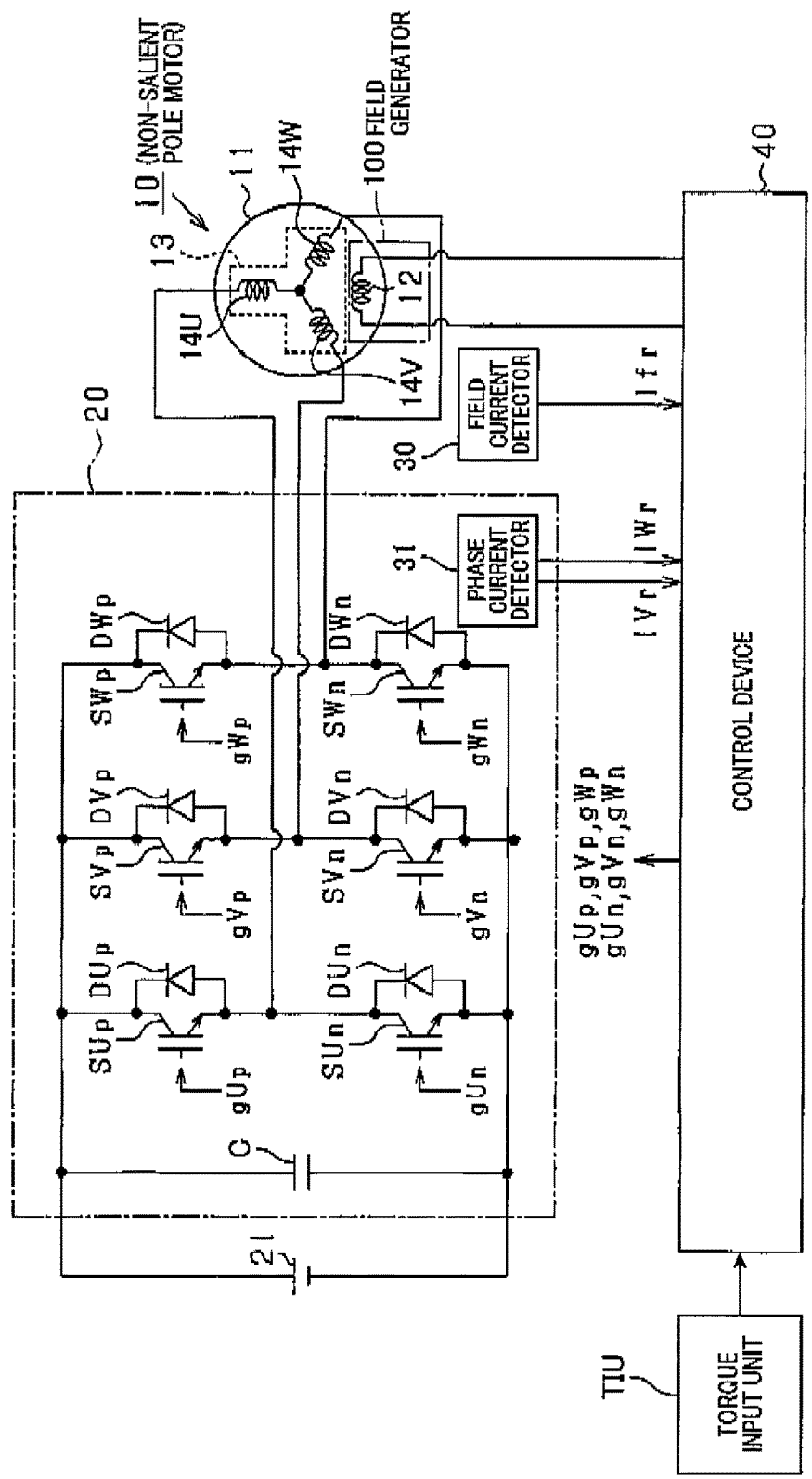
FIG. 1 is a circuit diagram of a control system for a motor according to the first embodiment of the present disclosure.

The following describes embodiments of the present disclosure with reference to the accompanying drawings. The drawings utilize identical reference characters to identify identical corresponding components.

First Embodiment

First, the following describes an apparatus for estimating the position of a predetermined magnetic pole of a rotor of a rotary electric machine, i.e. the actual rotational position of the direction of a magnetic field generated by a predetermined magnetic pole, i.e. an N pole, of the rotor, according to the first embodiment of the present disclosure.

Specifically, FIG. 1 illustrates a control system CS, which is installed in a motor vehicle including an unillustrated internal combustion engine as its main engine, for controlling a motor 10.

Referring to FIG. 1, the motor 10 is designed as a wound-field rotary electric machine having a non-salient pole characteristic, more specifically, as a three-phase wound-field synchronous motor. In other words, the motor 10 is designed as a non-salient pole motor 10. The motor 10 of the first embodiment serves as, for example, an integrated starter-generator (ISG) that serves as both a starter motor and an alternator as an example of generators.

The control system CS controls the motor 10 to initially crank the internal combustion engine, referred to simply as an engine. In particular, while the engine is automatically stopped, the control system CS performs an idle reduction function, i.e. an idle stop function, to cause the motor 10 to automatically restart the engine upon predetermined restart conditions being satisfied.

The motor 10 includes a rotor 11 including a rotor core and at least one field winding, i.e., at least one excitation winding, 12 wound around the rotor core to produce, for example, at least one pair of magnetic poles, i.e. N and S poles. The rotor 11 has a direct axis (d-axis) in line with a direction of magnetic flux created by the N pole of the at least one magnetic-pole pair. The rotor 11 also has a quadrature axis (q-axis) with a phase being π/2-radian electrical angle leading with respect to the d-axis during rotation of the rotor 11. In other words, the q-axis is electromagnetically perpendicular to the d-axis. The d and q axes constitute a d-q coordinate system, i.e. a first two-phase rotating coordinate system, defined relative to the rotor 11.

The non-salient structure of the motor 10, which represents the rotor 11 has the non-salient structure, means that an inductance Ld in the d-axis of the rotor 11 is equal to an inductance Lq in the q-axis of the rotor 11.

The rotor 11 is coupled to the crankshaft of the engine such that power is transmittable between the rotor 11 and the crankshaft.

The motor 10 also includes a stator having a stator core. The rotor is rotatably arranged with respect to the stator core. The stator also includes three-phase, i.e. U-, V-, and W-phase, windings, that is, armature windings, 14U, 14V, and 14W wound in the stator core such that the U-, V-, and W-phase windings 14U, 14V, and 14W have a phase difference of, for example, $2\pi/3$ radian from each other.

The field winding 12 and the three-phase windings 14U to 14W are arranged such that they are magnetically coupled to each other when energized.

The control system CS includes an inverter 20, a DC battery 21 as an example of DC power supplies, a control device 40, and a field generator 100. The control device 40 serves as, for example, the apparatus for estimating the position of the N pole of the rotor 11 of the motor 10 according to the first embodiment.

The inverter 20 is electrically connected to the three-phase windings 14U, 14V, and 14W, and to the DC battery 21.

Specifically, the motor 10 and the DC battery 21 can establish electrical connection therebetween via the inverter 20.

The inverter 20 serves as, for example, a circuit configured to convert a DC voltage output from the DC battery 21 into an AC (Alternating Current) voltage, and apply the AC voltage to the motor 10. Specifically the inverter 20 is designed as a three-phase inverter.

For example, the inverter 20 includes a first pair of series-connected high- and low-side (upper- and lower-arm) switching elements SUp and SUn, a second pair of series-connected high- and low-side (upper- and lower-arm) switching elements SVp and SVn, and a third pair of series-connected high- and low-side (upper- and lower-arm) switching elements SWp and SWn.

The first to third pairs of switching elements are parallely connected to each other in bridge configuration.

The connection point through which the switching elements SUp and SUn of the first pair are connected to each other in series is connected to an output lead extending from the separate terminal of the U-phase winding. Similarly, the connection point through which the switching elements SVp and SVn of the second pair are connected to each other in series is connected to an output lead extending from the separate end of the V-phase winding. Moreover, a connecting point through which the switching elements SWp and SWn of the third pair are connected to each other in series is connected to an output lead extending from the separate end of the W-phase winding.

The inverter 20 also includes flywheel diodes DUp, DUn, DVp, DVn, DWp, and DWn electrically connected in antiparallel to the respective switching elements SUp, SUn, SVp, SVn, SWp, and SWn.

The first embodiment uses IGBTs as the respective switching elements SUp, SUn, SVp, SVn, SWp, and SWn.

The first embodiment also can use power MOSFETs, such as N-channel MOSFETs as the switching elements S*#(* is U, V, and W, # is p and q). This modification can use the intrinsic diodes of the power MOSFETs as the flywheel diodes, thus eliminating the flywheel diodes D*#.

One end of the series-connected switching elements of each of the first, second, and third pairs, such as the collector of the corresponding high-side switching element, is connected to the positive terminal of the DC battery 21 via a positive terminal of the inverter 20. The other end of the series-connected switching elements of each of the first, second, and third pairs, such as the emitter of the corresponding low-side switching element, is connected to the negative terminal of the DC battery 21 via a negative terminal of the inverter 20.

The inverter 20 includes a capacitor C parallely connected to the DC battery 21. The capacitor C serves as, for example, a smoothing element.

Additionally, the control system CS includes a field current detector 30 and a phase current detector 31.

The field current detector 30 measures a field current Ifr flowing through the at least one field winding 12. The phase current detector 31 measures, for example, a V-phase current IVr and a W-phase current IWr flowing through the respective V- and W-phase windings 14V and 14W in a three-phase (UVW) stationary coordinate system at rest defined in the stator of the motor 10. For example, the field current detector 30 includes a current sensor equipped with a resistor and a current transformer, and the phase current detector 31 includes such current sensors provided for measuring the V- and W-phase phase currents IVr and IWr flowing through the respective V- and W-phase windings 14V and 14W.

The values measured by the field current detector 30 and phase current detector 31 are sent to the control device 40.

The control device 40 is designed as, for example, a computer circuit including, for example, a CPU and a nonvolatile memory. For example, the CPU runs programs previously stored in the nonvolatile memory, thus performing various tasks for controlling the motor 10.

The control device 26 is communicably connected to, for example, a torque input unit TIU for inputting, to the control device 40, request torque, i.e. command torque, Trq* for the motor 10 according to, for example, a request of an engine control unit for controlling the engine.

Specifically, the control device 40 generates, according to the values measured by the field current detector 30 and phase current detector 31 and the request torque Trq*, drive signals for driving the switching elements S*# of the inverter 20, thus adjusting a controlled variable, such as output torque, of the motor 10 to a command value, such as command torque accordingly. For example, the control device 40 according to the first embodiment periodically turns on or off each of the switching elements S*#, thus matching a current flowing through each of the three-phase windings 14U, 14V, and 14W with a corresponding one of command currents for the respective three-phase windings 14U, 14V, and 14W. The command currents for the respective three-phase windings 14U, 14V, and 14W are needed to achieve the command torque as the output torque of the motor 10. FIG. 1 shows the drive signals for the respective switching elements SUp, SUn, SVp, SVn, SWp, and SWn as drive signals gUp, gUn, gVp, gVn, gWp, and gWn.

Figure 2:
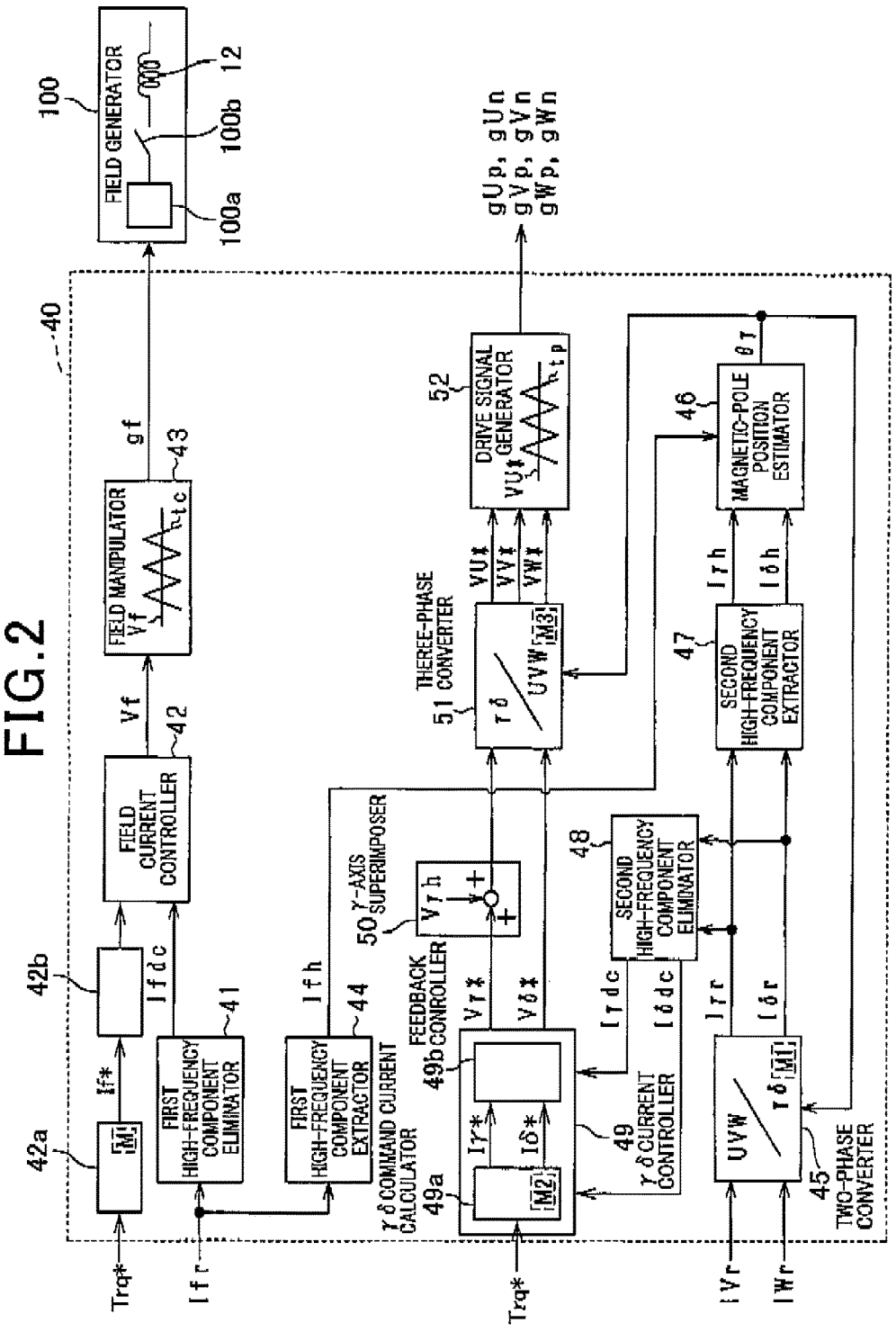
FIG. 2 is a block diagram schematically illustrating functional modules of a control device of the control system, which are equivalent to tasks to be executed thereby according to the first embodiment.

The field generator 100 includes, for example, a DC power source 100a, the at least one field winding 12, and a switching element 100b connected between the DC power source 100a and the at least one field winding 12 (see FIG. 2).

The control device 40 controls on-off operations of the switching element 100b, thus causing the field generator 100 to generate a DC voltage to be supplied to the at least one field winding 12 from the DC power source 100a while adjusting the level of the DC voltage. This controls the field current flowing through the at least one field winding 12.

In particular, the control system CS includes no rotational-position detectors, i.e. sensors, for directly detecting the rotational position of the N pole of the rotor 11. Thus, the control device 40 of the control system CS is configured to perform a task for controlling the motor 10, which includes an estimation task for estimating the rotational position of the N pole of the rotor 11.

The following describes the motor control task carried out by the control device 40 with reference to FIG. 2.

FIG. 2 schematically illustrates functional modules of the control device 40 equivalent to operations to be executed by the control device 40.

As illustrated in FIG. 2, the control device 40 includes a first high-frequency component eliminator 41, a field current controller 42, a field manipulator 43, and a first high-frequency component extractor 44. The control device 40 also includes a two-phase converter 45, a magnetic-pole position estimator 46, a second high-frequency component extractor 47, a second high-frequency component eliminator 48, an γδ current controller 49, a γ-axis superimposer 50, a three-phase converter 51, and a drive signal generator 52.

The first high-frequency component eliminator 41 eliminates high-frequency components contained in the field current Ifr measured by the field current detector 30. The following can describe the field current Ifr from which the high-frequency components have been eliminated as a field DC current Ifdc. For example, the first high-frequency component eliminator 41 can include a low-pass filter having a cut-off frequency that prevents high-frequency components whose frequencies higher than the cut-off frequency from passing therethrough.

Note that the high-frequency components according to the first embodiment are defined to have frequencies sufficiently higher than the frequency of the fundamental of a phase voltage across each of the three-phase windings 14U, 14V, and 14W. In particular, the high-frequency components according to the first embodiment are defined to be high enough to clearly distinguish the high-frequency components from the frequency of the fundamental of a phase voltage across each of the three-phase windings 14U, 14V, and 14W while capable of reducing ripples in the motor output.

The field current controller 42 includes a target current calculator 42a for calculating, based on, for example, the request torque Trq* and the rotating speed of the rotor 11, a target current, i.e. a target DC current component, If*. For example, field current controller 42 has a map M in datatable format, in mathematical expression format, and/or program format. The map M includes information indicative of a relationship between values of the request torque Trq*, values of the rotating speed of the rotor 11, and values of the target current If*. The target current calculator 42a refers to the map M, and extracts a value of the target current If* corresponding to a value of the request torque Trq* and a value of the rotating speed of the rotor 11.

The field current controller 42 also includes a feedback controller 42b for calculating a field command voltage Vf, which is a DC-voltage command value to be applied to the field winding 12; the field command voltage Vf serves as a manipulated variable for feedback controlling the field current Ifr, i.e. the field DC current Ifdc, to the target current If*.

For example, the feedback controller 42b of the first embodiment calculates a deviation ΔIf between the field current Ifr, i.e. the field DC current Ifdc, and the target current If*. Then, the feedback controller 42b performs a known proportional-integral (PI) feedback operation using the calculate deviation ΔIf as input data, and a proportional gain term and an integral gain term of a PI feedback control algorithm (PI algorithm). The PI feedback operation calculates the field command voltage Vf such that the calculated deviation ΔIf converges to zero, thus causing the field current Ifr, i.e. the field DC current Ifdc, to follow the target current If*. Using the field DC current Ifdc as the field current Ifr enables calculation of the field command voltage Vf with little influence of the high-frequency components.

The field manipulator 43 performs a known pulse-width modulation (PWM) task that compares in amplitude the field command voltage Vf with a cyclic carrier signal tc, for example, a cyclic triangular carrier signal tc, that positively and negatively oscillates with a predetermined cycle. Then, the PWM task generates, according to the compared results, a field drive signal gf, which is, for example, a pulse signal with a controllable duty, i.e. a controllable on-pulse width for each switching cycle matching with the cycle of the carrier tc. The field manipulator 43 outputs the field drive signal gf to the switching element of the field generator 100 to thereby control on-off operations of the switching element 100b in accordance with the controllable duty of the field drive signal gf. This causes the field current Ifr, i.e. the field DC current Ifdc, to follow the target current If*.

The first high-frequency component extractor 44 extracts a high-frequency field current Ifh, whose frequencies match with the high-frequency components, from the field current Ifr measured by the field current detector 30. For example, the first high-frequency component extractor 44 can include a band-pass filter or a high-pass filter having the cut-off frequency that prevents low-frequency components, whose frequencies are equal to or lower than the cut-off frequency, from passing therethrough. In other words, the high-pass filter passes the high-frequency components higher than the cut-off frequency therethrough while attenuating the low-frequency components equal to or lower than the cut-off frequency.

The two-phase converter 45 for example calculates a U-phase current IUr according to the V- and W-phase currents IVr and IWr measured by the phase current detector 31 using, for example, Kirchhoff's law. Then, the two-phase converter 45 converts the U-, V-, and W-phase currents IUr, IVr, and IWr in the three-phase stationary coordinate system into a γ-axis current Iγr and a δ-axis current Iδr in a γ-δ coordinate system according to an estimated magnetic-pole position θγ. The γ-δ coordinate system has a γ-axis and a δ-axis with a phase being π/2-radian electrical angle leading with respect to the γ-axis during rotation of the rotor 11. The γ-δ coordinate system is a second two-phase rotating coordinate system defined relative to the rotor 11, and the estimated magnetic-pole position θγ is estimated by the magnetic-pole position estimator 46 described in detail below.

Figure 3:
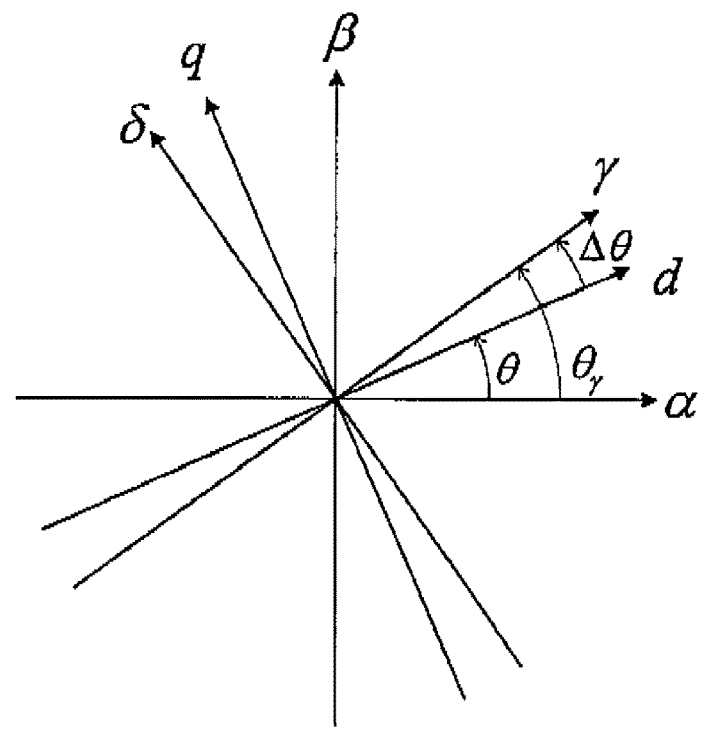
FIG. 3 is a graph schematically illustrating an estimated magnetic-pole position of a γ-axis and an actual rotational position of a d-axis with respect to an α-axis of a two-phase stationary coordinate system according to the first embodiment.

FIG. 3 schematically illustrates the estimated magnetic-pole position θγ of the γ-axis and the actual rotational position θ of the d-axis with respect to an α-axis of a two-phase stationary coordinate system, i.e. an α-β coordinate system; the a-axis matches with the U-axis of the three-phase stationary coordinate system. Note that an β axis of the α-β coordinate system is electromagnetically perpendicular to the α-axis.

Specifically, each of the estimated magnetic-pole position θγ of the γ-axis and the actual rotational position θ of the d-axis is represented as a corresponding electrical angle with respect to the α axis of the α-β coordinate, system. Each of the γ-δ coordinate system and the d-q coordinate system rotates by an electrical angular velocity ω of the rotor 11 with respect to the α-β coordinate system.

Because the control system CS includes no rotational-position detectors, i.e. sensors, for directly detecting the rotational position of the N pole of the rotor 11, i.e. the rotational position of the d-axis of the rotor 11, the magnetic-pole position estimator 46 estimates the magnetic-pole position θγ of the γ-axis as the actual rotational position θ of the d-axis. Thus, the control system CS is configured to stably cause an angular difference Δθ between the estimated magnetic-pole position θγ and the actual rotational position θ of the d-axis to converge to be zero. This configuration enables improvement of the accuracy of the motor control task.

Note that the polarity of each of the magnetic-pole position θγ of the γ-axis as the actual rotational position θ of the d-axis is defined to be positive when Each of the γ-δ coordinate system and the d-q coordinate system is rotating from the α-axis in the counterclockwise direction. Thus, the polarity of angular difference Δθ is defined to be positive when the γ-axis is leading with respect to the d-axis in the counterclockwise direction.

For example, the two-phase converter 45 has a map M1 in data-table format, in mathematical expression format, and/or program format. The map M1 includes information indicative of a relationship between values of the γ-axis current Iγr, values of the δ-axis current Iδr, values of the estimated magnetic-pole position θγ, and values of each of the U-, V-, and W-phase currents IUr, IVr, and IWr. The two-phase converter 45 refers to the map M1, and extracts a value of each of the γ-axis current Iγr and the δ-axis current Iδr corresponding to the obtained values of the respective U-, V-, and W-phase currents IUr, IVr, and IWr and the value of the estimated magnetic-pole position θγ.

Returning to FIG. 2, the second high-frequency component extractor 47 extracts a high-frequency γ-axis current Iγh and a high-frequency δ-axis current Iδh from the respective γ-axis current Iγr and δ-axis current Iδr; the high-frequency γ-axis current Iγh and high-frequency δ-axis current Iδh are high frequency components. For example, the second high-frequency component extractor 47 can include a bandpass filter or a high-pass filter having a cut-off frequency and passing the high-frequency components higher than the cut-off frequency therethrough while attenuating the low-frequency components equal to or lower than the cut-off frequency.

The second high-frequency component eliminator 48 eliminates high-frequency components contained in each of the γ-axis current Iγr and δ-axis current Iδr. The following can describe each of the γ-axis current Iγr and δ-axis current Iδr from which the high-frequency components have been eliminated as a corresponding one of a γ-axis DC current Iγdc and δ-axis DC current Iδdc. For example, the second high-frequency component eliminator 48 can include a low-pass filter having a cut-off frequency that prevents high-frequency components, whose frequencies are higher than the cut-off frequency, from passing therethrough.

The γδ current controller 49 includes a γδ command current calculator 49a for calculating, based on, for example, the request torque Trq*, γ- and δ-axis command currents Iγ* and Iδ* using, for example, a map M2 in data-table format, in mathematical expression format, and/or program format. The map M2 includes information indicative of a relationship between values of the request torque Trq* and values of each of the γ- and δ-axis command currents Iγ* and Iδ*. The γδ command calculator 49a refers to the map M2, and extracts a value of each of the γ- and δ-axis command currents Iγ* and Iδ* corresponding to a value of the request torque Trq*.

The γδ current controller 49 also includes a feedback controller 49b for calculating γ- and δ-axis command voltages Vγ* and Vδ*, each of which serves as a manipulated variable for feedback controlling a corresponding one of the γ- and δ-axis DC currents Iγdc and Iδdc to a corresponding one of γ- and δ-axis command currents Iγ* and Iδ*.

For example, the feedback controller 49b calculates a deviation ΔIγ between the γ-axis current Iγr and the γ-axis command currents Iγ* and a deviation ΔIδ between the γ-axis current Iδr and the δ-axis command currents Iδ*. Then, the feedback controller 49b performs a known proportional-integral (PI) feedback operation using each of the calculate deviations ΔIγ and ΔIδ as input data, and a proportional gain term and an integral gain term of a PI feedback control algorithm (PI algorithm).

The PI feedback operation calculates the γ-axis command voltage Vγ* such that the calculate deviation ΔIγ converges to zero, thus causing the γ-axis DC current Iγdc to follow the γ-axis command current Iγ*.

The PI feedback operation also calculates the δ-axis command voltage Vδ* such that the calculate deviation ΔIδ converges to zero, thus causing the δ-axis DC current Iδdc to follow the δ-axis command current Iδ*.

The γ-axis superimposer 50, which serves as, for example, a voltage applier or a voltage applying unit, generates a high-frequency γ-axis voltage Vγh having, for example, sinusoidal waveform, and superimposes the high-frequency γ-axis voltage Vγh on the γ-axis command voltage Vγ* output from the γδ current controller 49, thus generating a combined γ-axis command voltage (Vγ*+Vγh). Then, the γ-axis superimposer 50 outputs the combined γ-axis command voltage (Vγ*+Vγh) to the three-phase converter 51.

The three-phase converter 51 converts, according to the estimated magnetic-pole position θγ, the combined γ-axis command voltage (Vγ*+Vγh) and the δ-axis command voltage Vδ* into U-, V-, and W-phase command voltages VU*, W*, and VW* in the three-phase stationary coordinate system. Each of the U-, V-, and W-phase command voltages VU*, VV*, and VW* has, for example, a substantially pseudo sinusoidal waveform.

For example, the three-phase converter 51 has a map M3 in data-table format, in mathematical expression format, and/or program format. The map M3 includes information indicative of a relationship between values of the combined γ-axis command voltage (Vγ*+Vγh), values of the δ-axis command voltage Vδ*, values of each of the U-, V-, and W-phase command voltages VU*, VV*, and VW*, and values of the estimated magnetic-pole position θγ. The three-phase converter 51 refers to the map M3, and extracts a value of each of the U-, V-, and W-phase command voltages VU*, VV*, and VW* corresponding to the obtained values of the combined γ-axis command voltage (Vγ*+Vγh) and the δ-axis command voltage Vδ* and to the value of the estimated magnetic-pole position θγ.

The drive signal generator 52 performs a PWM task based on comparison in magnitude between the three-phase command voltages VU*, VV*, and VW* and a cyclic carrier signal tp, for example, a cyclic triangular carrier signal tp, thus generating drive signals gUp, gUn, gVp, gVn, gWp, and gWn for the respective switching elements SUp, SUn, SVp, SVn, SWp, and SWn according to the compared results. Each of the drive signals gUp, gUn, gVp, gVn, gWp, and gWn is a pulse signal with a controllable duty cycle (controllable pulse width). Then, the drive signal generator 52 applies each of the drive signals gUp, gUn, gVp, gVn, gWp, and gWn to the gate of a corresponding one of the switching elements drive signals gUp, gUn, gVp, gVn, gWp, and gWn.

This performs on-off operations of each of the switching elements SUp, SUn, SVp, SVn, SWp, and SWn according to the duty cycle of a corresponding one of the drive signals gUp, gUn, gVp, gVn, gWp, and gWn. The on-off operations of each of the switching elements SUp, SUn, SVp, SVn, SWp, and SWn causes sinusoidal U-, V-, and W-phase currents, which have phase differences of 120 electrical degrees therebetween, to flow through the respective U-, V-, and W-phase windings of the starter of the motor 10.

Next, the following describes the principles of estimating the rotational position of the N pole, i.e. the d-axis, of the rotor 11, and describes a magnetic-pole estimation task carried out by the magnetic-pole position estimator 46.

First, the following describes the principles of estimating the rotational position of the N pole, i.e. the d-axis, of the rotor 11.

The following equation [eq1] describes a voltage equation for the non-salient structure synchronous motor 10 having the angular difference $\Delta\theta$ between the estimated magnetic-pole position $\theta\gamma$ and the actual rotational position $\theta$ of the d-axis when the three-phase armature windings are equivalently converted into d- and q-axis armature windings:

$$\begin{bmatrix} V\gamma \\ V\delta \\ Vf \end{bmatrix} = \begin{bmatrix} R \cdot I\gamma \\ R \cdot I\delta \\ Rf \cdot If \end{bmatrix} + \quad [\text{eq 1}]$$

$$s\begin{bmatrix} L0 + L1 \cdot \cos(2\Delta\theta) & -L1 \cdot \sin(2\Delta\theta) & Mf \cdot \cos(\Delta\theta) \\ -L1 \cdot \sin(2\Delta\theta) & L0 - L1 \cdot \cos(2\Delta\theta) & -Mf \cdot \sin(\Delta\theta) \\ Mf \cdot \cos(\Delta\theta) & -Mf \cdot \sin(\Delta\theta) & Lf \end{bmatrix}$$

$$\begin{bmatrix} I\gamma \\ I\delta \\ If \end{bmatrix} + \omega \begin{bmatrix} \\ \\ \end{bmatrix}$$

$$\begin{bmatrix} L1 \cdot \sin(2\Delta\theta) & -L0 + L1 \cdot \cos(2\Delta\theta) & Mf \cdot \sin(\Delta\theta) \\ L0 + L1 \cdot \cos(2\Delta\theta) & -L1 \cdot \sin(2\Delta\theta) & Mf \cdot \cos(\Delta\theta) \\ 0 & 0 & 0 \end{bmatrix}$$

$$\begin{bmatrix} I\gamma \\ I\delta \\ If \end{bmatrix}$$

Where (1) $L0 = \dfrac{Ld + Lq}{2}$ (2) $L1 = \dfrac{Ld - Lq}{2}$ (3) $\Delta\theta = \theta\gamma - \theta$
(4) $V\gamma$ represents an actual voltage in the $\gamma$-axis
(5) $V\delta$ represents an actual voltage in the $\delta$-axis
(6) Vf represents the voltage applied to the field winding 12
(7) $I\gamma$ represents an actual current flowing in the $\gamma$-axis
(8) $I\delta$ represents an actual current flowing in the $\delta$-axis
(9) If represents the field current flowing through the field winding 12
(10) Ld represents the inductance in the d-axis armature winding
(11) Lq represents the inductance in the q-axis armature winding

(12) R represents a resistance of each of the d- and q-axis armature windings
(13) Lf represents a self-inductance of the field winding 12
(14) Rf represents a resistance across the field winding 12
(15) Mf represents a mutual inductance in the d-axis between the field winding 12 and the d- and q-axis armature windings
(16) s represents a differential operator.

Figure 4:
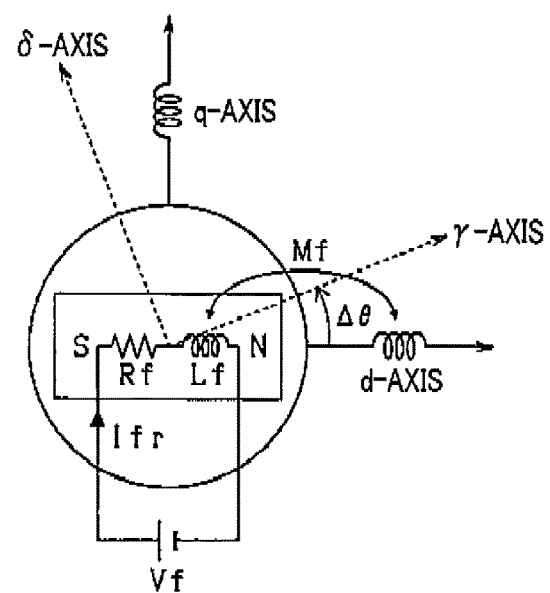
FIG. 4 is a view schematically illustrating magnetic coupling between a field winding and a d-axis armature winding when energized.

As described above, the field winding 12 and the d-axis armature winding are magnetically coupled to each other when energized (see FIG. 4).

The equation [eq1] enables the following equation [eq2] to be derived if (1) The rotating speed of the rotor 11 is zero or a low value, i.e. the angular velocity $\omega$ of the rotor 11 is approximately equal to zero, i.e. $\omega \approx 0$ (2) The resistances R and Rf are ignored because of the high-frequency components of the voltages $V\gamma$, $V\delta$, Vf and currents $I\gamma$, $I\delta$, If are applied:

$$\begin{bmatrix} V\gamma h \\ V\delta h \\ Vfh \end{bmatrix} = \quad [\text{eq 2}]$$

$$s\begin{bmatrix} L0 + L1 \cdot \cos(2\Delta\theta) & -L1 \cdot \sin(2\Delta\theta) & Mf \cdot \cos(\Delta\theta) \\ -L1 \cdot \sin(2\Delta\theta) & L0 - L1 \cdot \cos(2\Delta\theta) & -Mf \cdot \sin(\Delta\theta) \\ Mf \cdot \cos(\Delta\theta) & -Mf \cdot \sin(\Delta\theta) & Lf \end{bmatrix}\begin{bmatrix} I\gamma h \\ I\delta h \\ Ifh \end{bmatrix}$$

Where index h assigned to each of the voltages $V\gamma$, $V\delta$, Vf and currents $I\gamma$, $I\delta$, If represents the high-frequency components of a corresponding one of the voltages $V\gamma$, $V\delta$, Vf and currents $I\gamma$, $I\delta$, If.

The motor 10 is designed as a non-salient pole motor 10, which causes L1 to be approximately zero (L1≈0). This enables the equation [eq2] to be converted into the following equation [eq3]:

$$\begin{bmatrix} V\gamma h \\ V\delta h \\ Vfh \end{bmatrix} = s\begin{bmatrix} L0 & 0 & Mf \cdot \cos(\Delta\theta) \\ 0 & L0 & -Mf \cdot \sin(\Delta\theta) \\ Mf \cdot \cos(\Delta\theta) & -Mf \cdot \sin(\Delta\theta) & Lf \end{bmatrix}\begin{bmatrix} I\gamma h \\ I\delta h \\ Ifh \end{bmatrix} \quad [\text{eq 3}]$$

Solving the equation [eq3] in terms of the currents $I\gamma$, $I\delta$, If derives the following equation [eq4]:

$$\begin{bmatrix} I\gamma h \\ I\delta h \\ Ifh \end{bmatrix} = \frac{1}{s} \cdot \frac{1}{L0(L0 \cdot Lf - Mf^2)} \times \quad [\text{eq 4}]$$

$$\begin{bmatrix} L0 \cdot Lf - \dfrac{1}{2}Mf^2 & -\dfrac{1}{2}Mf^2 \cdot \sin(2\Delta\theta) & -L0 \cdot Mf \cdot \cos(\Delta\theta) \\ (1 - \cos(2\Delta\theta)) & & \\ -\dfrac{1}{2}Mf^2 \cdot \sin(2\Delta\theta) & L0 \cdot Lf - \dfrac{1}{2}Mf^2 & L0 \cdot Mf \cdot \sin(\Delta\theta) \\ & (1 + \cos(2\Delta\theta)) & \\ -L0 \cdot Mf \cdot \cos(\Delta\theta) & L0 \cdot Mf \cdot \sin(\Delta\theta) & L0^2 \end{bmatrix}$$

$$\begin{bmatrix} V\gamma h \\ V\delta h \\ Vfh \end{bmatrix}$$

As described above, the first embodiment, i.e. the γ-axis superimposer 50, applies the sinusoidal high-frequency γ-axis voltage Vγh to the γ-axis command voltage Vγ*; the sinusoidal high-frequency γ-axis voltage Vγh is expressed by the following equation [eq5]:

$$\begin{bmatrix} V\gamma h \\ V\delta h \\ Vfh \end{bmatrix} = \begin{bmatrix} V0 \cdot \sin(2\pi \cdot fh \cdot t) \\ 0 \\ 0 \end{bmatrix} \quad [\text{eq 5}]$$

Where V0 represents the amplitude of the high-frequency γ-axis voltage Vγh, fh represents the frequency of the high-frequency γ-axis voltage Vγh, and t represents time. Applying the high-frequency γ-axis voltage Vγh to the γ-axis command voltage Vγ* enables the high-frequency field current Ifh to flow through the field winding 12; the high-frequency field current Ifh is expressed by the following equation [eq6]:

$$Ifh = \frac{Mf \cdot V0}{2\pi \cdot fh(L0 \cdot Lf - Mf^2)} \cos(\Delta\theta) \cdot \cos(2\pi \cdot fh \cdot t) \quad [\text{eq 6}]$$

The equation [eq6] shows that the amplitude of the high-frequency field current Ifh includes the cosine function, i.e. cos(Δθ), with the angular difference Δθ between the γ-axis and the d-axis as its independent variable. This enables the amplitude of the high-frequency field current Ifh to be maximized if the angular difference Δθ becomes zero so that cos(Δθ) is equal to 1.

Figure 5A:
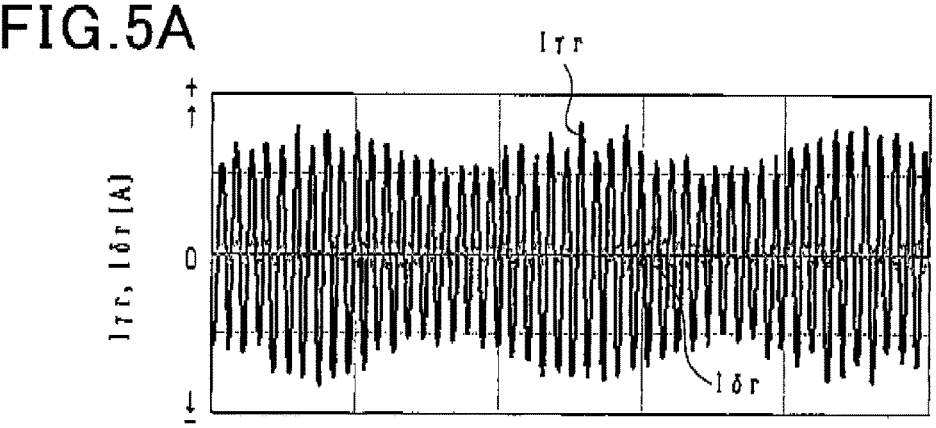
FIG. 5A is a graph schematically illustrating how each of γ- and δ-axis currents changes with time according to the first embodiment.
Figure 5B:
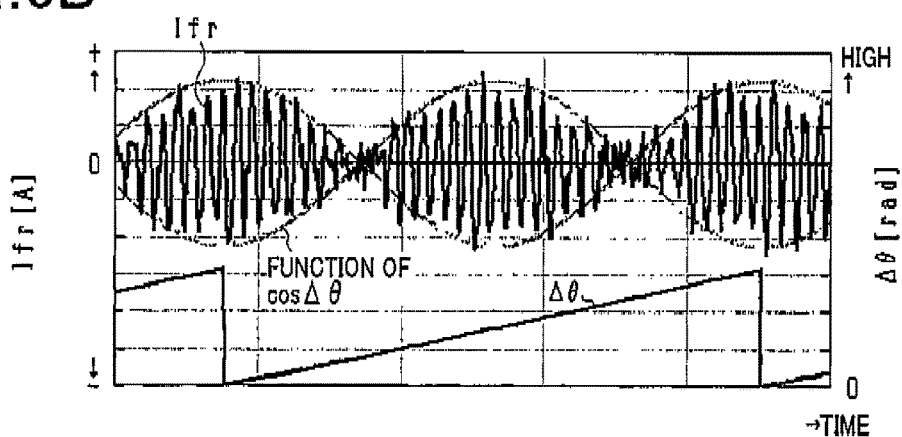
FIG. 5B is a graph schematically illustrating how each of an angular difference and a high-frequency field current changes with time according to the first embodiment.

FIGS. 5A and 5B illustrate that the amplitude of the high-frequency field current Ifh is maximized when the angular difference Δθ becomes zero. Specifically, FIG. 5A illustrates how each of the γ- and δ-axis currents Iγr and Iδr changes with time, and FIG. 5B illustrates how each of the angular difference Δθ and the high-frequency field current Ifh changes with time. FIG. 5B shows that the amplitude of the field current Ifr including the high-frequency field current Ifh is varied as a function of the cos (Δθ).

The magnetic-pole position estimator 46 according to the first embodiment is configured to estimate the magnetic-pole position θγ of the rotor 11 in accordance with the equation [eq6] representing that the amplitude of the high-frequency field current Ifh to be maximized if the angular difference Δθ becomes zero.

Next, the following describes an example of the structure of the magnetic-pole position estimator 46.

Figure 6:
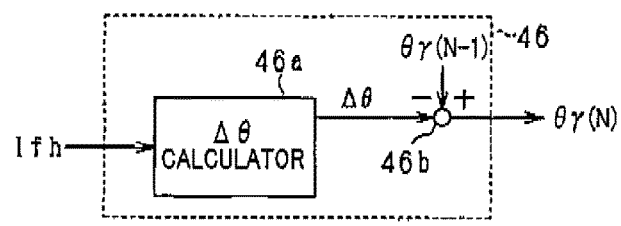
FIG. 6 is a block diagram schematically illustrating an example of the structure of a magnetic-pole position estimator illustrated in FIG. 2 according to the first embodiment.

Referring to FIG. 6, the magnetic-pole position estimator 46 includes an angular difference calculator, i.e. Δθ calculator, 46a and an angular difference corrector 46b. For example, the magnetic-pole position estimator 46 periodically estimates the magnetic-pole position θγ of the rotor 11 while rotation of the motor 10, i.e. the rotor 11, is stopped or the rotating speed of the motor 10, i.e. the rotor 11, is equal to or lower than a predetermined threshold speed, that is, the rotating speed of the motor 10 is approximately equal to zero. Note that the target current calculator 42a can determine the target current, i.e. the target DC current component, If* to zero or a value other than zero each time the magnetic-pole estimator 46 is estimating the magnetic-pole position θγ of the rotor 11.

Specifically, the angular difference calculator 46a calculates the angular difference Δθ in accordance with the following equations [eq7a] and [eq7b] and the high-frequency field current Ifh extracted by the first high-frequency component extractor 44; reorganizing the equation [eq6] obtains the following equations [eq7a] and [eq7b]:

$$\cos(\Delta\theta) = \frac{2\pi \cdot fh(L0 \cdot Lf - Mf^2)Ifh}{Mf \cdot V02 \cdot \cos(2\pi \cdot fh \cdot t)} \quad [\text{eq 7a}]$$

$$\Delta\theta = \cos^{-1}\left(\frac{2\pi \cdot fh(L0 \cdot Lf - Mf^2)Ifh}{Mf \cdot V02 \cdot \cos(2\pi \cdot fh \cdot t)}\right) \quad [\text{eq 7b}]$$

The motor 10 has the predetermined constant values of the above parameters L0, Lf, and Mf. In other words, the angular difference calculator 46a has known the values of the above parameters L0, Lf, and Mf in the equation [eq7b]. In addition, because the γ-axis superimposer 50, i.e. the control device 40, generates the high-frequency γ-axis voltage Vγh, the angular difference calculator 46a can obtain the values of the above parameters V0, fh, and t in the equations [eq7a] and [eq7b].

Thus, the angular difference calculator 46a is capable of cyclically calculating, in accordance with the equation [eq7b], the angular difference Δθ using the high-frequency field current Ifh as the input thereto while the rotating speed of the motor 10 is equal to or lower than the predetermined threshold speed. Note that the angular difference calculator 46a calculates the angular difference Δθ with the range from 0 inclusive to 2π exclusive; the electrical angle 2π represents one electrical-angular period of the rotor 11.

The angular difference corrector 46b cyclically estimates a value of the magnetic-pole position θγ of the rotor 11 according to a value of the angular difference Δθ cyclically calculated by the angular difference calculator 46a. Specifically, the angular difference corrector 46b estimates a value θγ(N) of the magnetic-pole position θγ in a present cycle N where N is an integer equal to or more than 2 in accordance with a value θγ(N−1) of the magnetic-pole position θγ estimated in the last previous cycle (N−1) and a value Δθ(N) of the angular difference Δθ calculated by the angular difference corrector 46b in the present cycle N.

More specifically, the angular difference corrector 46b subtracts the value Δθ(N) of the angular difference Δθ calculated by the angular difference corrector 46b in the present cycle N from the value θγ(N−1) of the magnetic-pole position θγ estimated in the last previous cycle (N−1). This corrects the value θγ(N−1) of the magnetic-pole position θγ estimated in the last previous cycle (N−1) to thereby estimate the value θγ(N) of the magnetic-pole position θγ in a present cycle N.

That is, the value θγ(N) of the magnetic-pole position θγ estimated in the present cycle N is substantially equal to the actual rotational position θ of the d-axis of the rotor 11.

Then, the angular difference corrector 46b cyclically outputs the value θγ(N) of the magnetic-pole position θγ to the two-phase converter 45 and three-phase converter 51 set forth above.

The above control system CS, in particular, the control device 40, according to the first embodiment estimates the magnetic-pole position θγ, whose value substantially matches with, i.e. follows, the actual rotational position θ of the d-axis of the rotor 11, in accordance with the high-frequency field current Ifh. The high-frequency field current Ifh, which is generated based on application of the high-frequency γ-axis voltage Vγh on the γ-axis command voltage Vγ*, includes information about the angular difference Δθ.

In other words, the high-frequency field current Ifh is expressed as a function with the angular difference Δθ as its independent variable.

This configuration of the control system CS enables the magnetic-pole position δγ, whose value substantially follows the actual rotational position θ of the d-axis of the rotor 11, to be estimated even if the motor 10 has a non-salient pole characteristic.

Additionally, the control device 40 of the control system CS includes the first high-frequency component extractor 44 for extracting the high-frequency field current Ifh from the field current Ifr measured by the field current detector 30. This enables estimation of the magnetic-pole position θγ, whose value substantially follows the actual rotational position θ of the d-axis of the rotor 11, even while the motor 10 is operating.

Second Embodiment

The following describes a control device 40A for estimating the magnetic-pole position θγ of the rotor 11 according to the second embodiment of the present disclosure. The structure and/or functions of the control device 40A according to the second embodiment differ from the control device 40 according to the first embodiment in the following points. So, the following mainly describes the different points.

Figure 7:
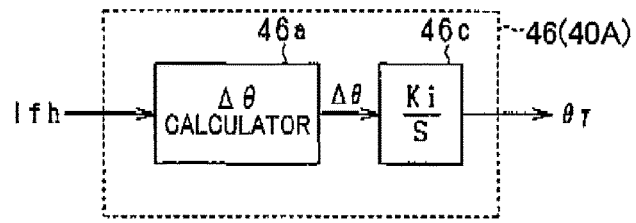
FIG. 7 is a block diagram schematically illustrating an example of the structure of a magnetic-pole position estimator according to the second embodiment of the present disclosure.

FIG. 7 schematically illustrates an example of the structure of a magnetic-pole estimator 46A of the control device 40A. The magnetic-pole estimator 46A of the second embodiment is configured to change the magnetic-pole position θγ of the rotor 11 such that the angular difference Δθ converges to zero, in other words, the amplitude of the high-frequency field current Ifh is maximized.

Referring to FIG. 7, the magnetic-pole estimator 46A includes the angular difference calculator 46a set forth above, and a manipulated-variable calculator 46c.

The manipulated-variable calculator 46c performs a known integral feedback operation using the calculated angular difference Δθ as input data and a feedback gain term Ki of a feedback control algorithm. Note that reference character S represents a Laplace operator.

That is, the feedback operation cyclically calculates the product of the feedback gain term Ki and the temporal integration of the calculated angular difference Δθ as the magnetic-pole position θγ of the rotor 11. This enables the calculated angular difference Δθ to converge to zero, which maximizes the amplitude of the high-frequency field current Ifh.

Like the control device 40, the aforementioned control device 40A according to the second embodiment estimates the magnetic-pole position θγ, whose value substantially matches with, i.e. follows, the actual rotational position θ of the d-axis of the rotor 11, in accordance with the high-frequency field current Ifh. Accordingly, the control device 40A achieves the same advantageous effects as the control device 40 does.

Third Embodiment

The following describes a control device 40B for estimating the magnetic-pole position θγ of the rotor 11 according to the third embodiment of the present disclosure. The structure and/or functions of the control device 40B according to the third embodiment differ from the control device 40A according to the second embodiment in the following points. So, the following mainly describes the different points.

Figure 8:
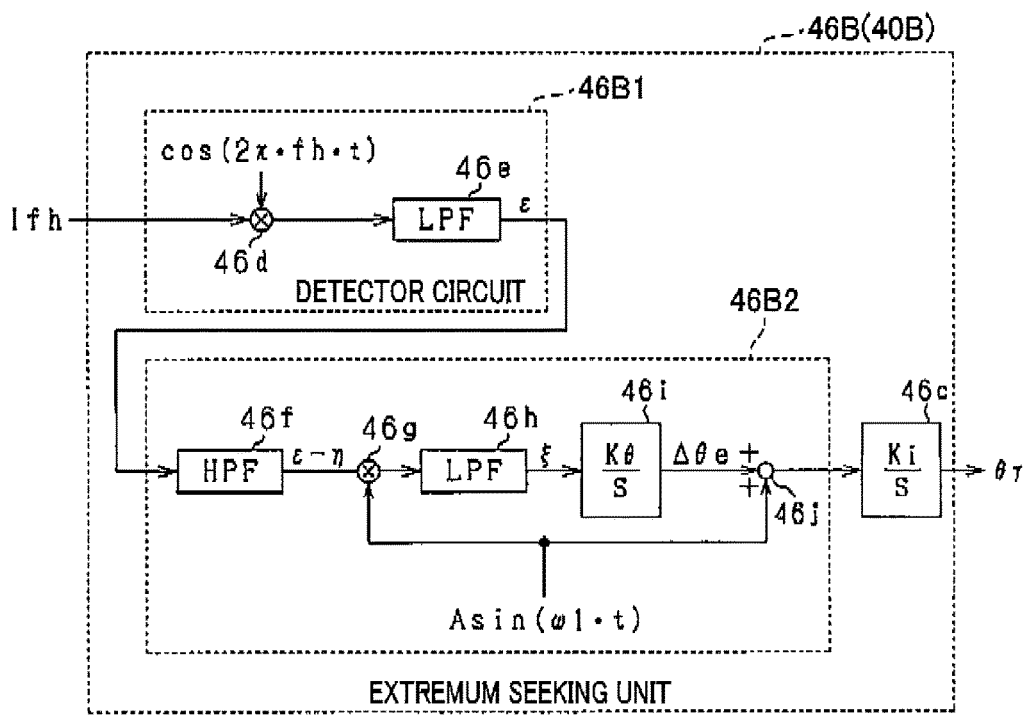
FIG. 8 is a block diagram schematically illustrating an example of the structure of a magnetic-pole position estimator according to the third embodiment of the present disclosure.

FIG. 8 schematically illustrates an example of the structure of a magnetic-pole estimator 46B of the control device 40B. The magnetic-pole estimator 46B of the third embodiment is configured to change the magnetic-pole position θγ of the rotor 11 such that the angular difference Δθ converges to zero, in other words, the amplitude of the high-frequency field current Ifh is maximized in a different approach from the approach used by the second embodiment.

Referring to FIG. 8, the magnetic-pole estimator 46B includes a detector circuit 46B1, an extremum seeking unit 46B2, and the above manipulated-variable calculator 46c.

The detector circuit 46B1 applies an amplitude detector task to the high-frequency field current Ifh, thus extracting the amplitude component of the high-frequency field current Ifh from the high-frequency field current Ifh.

For example, the detector circuit 46B1 includes a first multiplier 46d and a first low-pass filter (LPF) 46e. The first multiplier 46d multiplies the high-frequency field current Ifh by a high-frequency signal cos(2π·fh·t) having the same phase and the same frequency of the high-frequency field current Ifh, thus outputting a multiplied high-frequency signal S1, expressed by Ifh×cos(2π·fh·t), to the low-pass filter 46e.

The product-to-sum formula for cosine, which is represented as cos X cos Y=½{cos(X+Y)+cos(X−Y)}, enables the multiplied high-frequency signal S1 to be expressed as follows:

$$S1 = \frac{\alpha}{2}\{\cos(\beta+\beta) + \cos(\beta-\beta)\} = \frac{\alpha}{2}\{\cos 2\beta + 1\}$$

Where $$\alpha = \frac{Mf \cdot V0}{2\pi \cdot fh(L0 \cdot Lf - Mf^2)}\cos(\Delta\theta),$$

and β=2π·fh·t,

This expresses the multiplied high-frequency signal S1 as follows:

$$S1 = \frac{Mf \cdot V0}{4\pi \cdot fh(L0 \cdot Lf - Mf^2)}\cos(\Delta\theta) \cdot \{(\cos 4\pi \cdot fh \cdot t) + 1\}$$

The first low-pass filter 46e eliminates the high-frequency component $$\frac{Mf \cdot V0}{4\pi \cdot fh(L0 \cdot Lf - Mf^2)}\cos(\Delta\theta) \cdot (\cos 4\pi \cdot fh \cdot t)$$

from the multiplied high-frequency signal S1, thus extracting the amplitude component, referred to as ε(Δθ), from the multiplied high-frequency signal S1; the amplitude component ε(Δθ) is expressed by the following equation [eq8]:

$$\varepsilon(\Delta\theta) = \frac{Mf \cdot V0}{4\pi \cdot fh(L0 \cdot Lf - Mf^2)}\cos(\Delta\theta) \qquad [\text{eq 8}]$$

Note that the actual output of the first low-pass filter 46e includes components based on a high-frequency component A·sin(ω1·t), so that the actual output of the first low-pass filter 46*e* is expressed by the left-hand side ε(Δθ+A·sin(ω1-t)) of the equation [eq10] described later.

The extremum seeking unit 46B2 and the manipulated-variable calculator 46*c* are configured to change the angular difference Δθ to maximize the amplitude component ε(Δθ), thus causing the angular difference Δθ to converge to zero.

Specifically, the extremum seeking unit 46B2 includes, for example, a high-pass filter (HPF) 46*f*, a second multiplier 46*g*, a second low-pass filter (LPF) 46*h*, an integrator 46*i*, and an adder 46*j*.

The high-pass filter 46*f* applies a high-pass filtering task to the amplitude component ε(Δθ), thus eliminating a DC component η from the amplitude component ε(Δθ). The fluctuation component output from the high-pass filter 46*f*, which is referred to as {ε(Δθ)−η}, is expressed by the following equation [eq9]:

$$\varepsilon(\Delta\theta) - \eta = A \cdot \sin(\omega 1 \cdot t) \frac{d\varepsilon}{d(\Delta\theta)}. \quad [\text{eq 9}]$$

The following describes how to derive the equation [eq9].

Taylor expansion based on the equation [eq8] derives the following equation [eq10]:

$$\varepsilon(\Delta\theta + A \cdot \sin(\omega 1 \cdot t)) = \varepsilon(\Delta\theta) + A \cdot \sin(\omega 1 \cdot t) \frac{d\varepsilon(\Delta\theta)}{d(\Delta\theta)} \quad [\text{eq 10}]$$

The second term of the right side of the equation [eq10] represents the fluctuation component {ε(Δθ)−η}.

The second multiplier 46*h* multiplies the fluctuation component {ε(Δθ)−η} by a high-frequency component A·sin(ω1·t), thus outputting a multiplied high-frequency signal S2.

Specifically, the product-to-sum formula for sine, which is represented as sin X sin Y=½{cos(X−Y)−cos(X+Y)}, enables the multiplied high-frequency signal S2 to be expressed as follows:

$$S2 = \frac{\alpha}{2}\{\cos(\beta - \beta) - \cos(\beta + \beta)\} = \frac{\alpha}{2}\{1 - \cos 2\beta\}$$

Where $$\alpha = A^2 \cdot \frac{d\varepsilon(\Delta\theta)}{d(\Delta\theta)},$$

and β=ω1·t.

This expresses the multiplied high-frequency signal S2 as follows:

$$S2 = \frac{A^2}{2} \cdot \frac{d\varepsilon(\Delta\theta)}{d(\Delta\theta)} \cdot \{1 - \cos 2\omega 1 \cdot t\}$$

The second low-pass filter 46*h* eliminates the high-frequency component $$\frac{A^2}{2} \cdot \frac{d\varepsilon(\Delta\theta)}{d(\Delta\theta)} \cdot (-\cos 2\omega 1 \cdot t)$$

from the multiplied high-frequency signal S2, thus extracting a DC component ξ from the multiplied high-frequency signal S2; the DC component ξ is expressed by the following equation [eq11]:

$$\xi = \frac{A^2}{2} \cdot \frac{d\varepsilon(\Delta\theta)}{d(\Delta\theta)} \quad [\text{eq 11}]$$

The integrator 46*i* multiplies the DC component ξ output from the second low-pass filter 46*h* by an integral gain Kθ, and integrates the multiplied DC component ξ over time, thus calculating an angular-difference estimation Δθe.

The adder 46*j* adds a sine signal A·sin(ω1·t) to the angular-difference estimation Δθe calculated by the integrator 46*i*, thus outputting a signal expressed by {Δθe+A·sin(ω1·t)}. Adding the sine signal A·sin(ω1·t) to the angular-difference estimation Δθe enables the output signal expressed by {Δθe+A·sin(ω1·t)} to be maximized if the angular-difference estimation Δθe becomes zero.

The manipulated-variable calculator 46*c* performs a known integral feedback operation using the signal expressed by {Δθe+A·sin(ω1·t)| as input data and a feedback gain term Ki of a feedback control algorithm. The feedback operation calculates a value of the magnetic-pole position θγ of the rotor 11 such that the signal expressed by {Δθe+A·sin(ω1·t)}converges to zero, which maximizes the amplitude component ε(Δθ) of the high-frequency field current Ifh.

That is, the feedback operation calculates the product of the feedback gain term Ki and the signal expressed by {Δθe+A·sin(ω1·t)| as the magnetic-pole position θγ of the rotor 11. This enables the calculated angular-difference estimation Δθe converge to zero, which maximizes the amplitude of the high-frequency field current Ifh.

Like the control device 40A, the aforementioned control device 40B according to the third embodiment estimates the magnetic-pole position θγ, whose value substantially matches with, i.e. follows, the actual rotational position θ of the d-axis of the rotor 11, in accordance with the high-frequency field current Ifh. Accordingly, the control device 40B achieves the same advantageous effects as the control device 40A does.

Fourth Embodiment

The following describes a control device 40C for estimating the magnetic-pole position θγ of the rotor 11 according to the fourth embodiment of the present disclosure. The structure and/or functions of the control device 40C according to the fourth embodiment differ from the control device 40 according to the first embodiment in the following points. So, the following mainly describes the different points.

Figure 9:
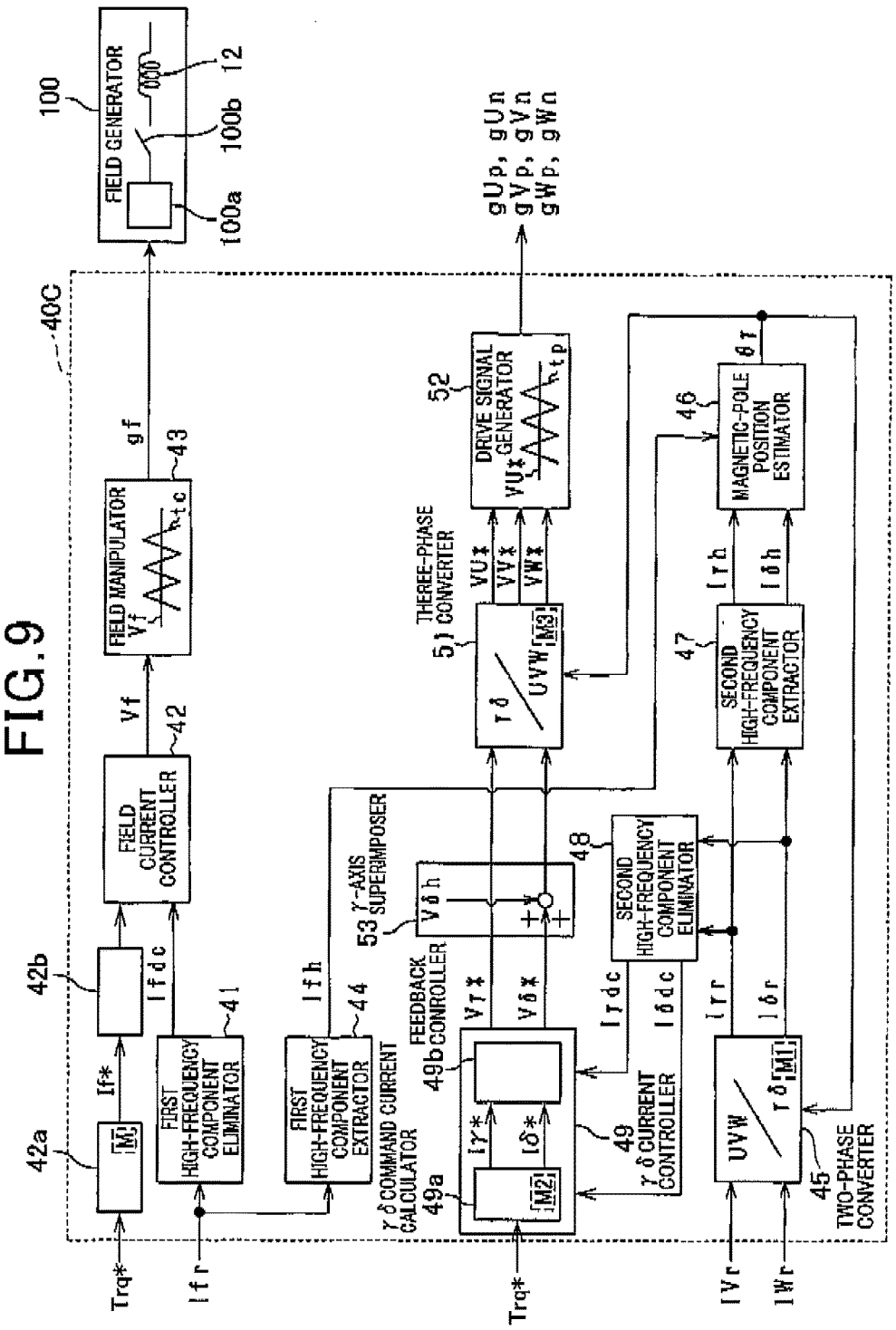
FIG. 9 is a block diagram schematically illustrating functional modules of a control device according to the fourth embodiment of the present disclosure.

FIG. 9 schematically illustrates functional modules of the control device 40C equivalent to operations to be executed by the control device 40C. The functional modules illustrated in FIG. 9, which are substantially identical to the functional modules illustrated in FIG. 2, have the same reference numerals assigned thereto as the reference numerals of the functional modules illustrated in FIG. 2.

Referring to FIG. 9, the control device 40C includes a δ-axis superimposer 53 in place of the γ-axis superimposer 50.

The δ-axis superimposer 53, which serves as, for example, a voltage applier or a voltage applying unit, generates a high-frequency δ-axis voltage Vδh having, for example, sinusoidal waveform, and superimposes the high-frequency δ-axis voltage Vδh on the δ-axis command voltage Vδ* output from the γδ current controller 49, thus generating a combined δ-axis command voltage (Vδ*+Vδh). Then, the δ-axis superimposer 53 outputs the combined δ-axis command voltage (Vδ*+Vδh) to the three-phase converter 51.

The three-phase converter 51 converts, according to the estimated magnetic-pole position θγ, the γ-axis command voltage Vγ* and the combined δ-axis command voltage (Vδ*+Vδh) into U-, V-, and W-phase command voltages VU*, VV*, and VW* in the three-phase stationary coordinate system. Each of the U-, V-, and W-phase command voltages VU*, VV*, and VW* has, for example, a substantially pseudo sinusoidal waveform.

Specifically, the δ-axis superimposer 53 applies the sinusoidal high-frequency δ-axis voltage Vδh to the 3-axis command voltage Vδ* in accordance with the following equation [eq12]:

$$\begin{bmatrix} V\gamma h \\ V\delta h \\ Vfh \end{bmatrix} = \begin{bmatrix} 0 \\ V0 \cdot \sin(2\pi \cdot fh \cdot t) \\ 0 \end{bmatrix} \quad [\text{eq 12}]$$

Applying the high-frequency δ-axis voltage Vδh to the δ-axis command voltage Vδ* enables the high-frequency field current Ifh to flow through the field winding 12; the high-frequency field current Ifh is expressed by the following equation [eq13]:

$$Ifh = \frac{-Mf \cdot V0}{2\pi \cdot fh(L0 \cdot Lf - Mf^2)} \sin(\Delta\theta) \cdot \cos(2\pi \cdot fh \cdot t) \quad [\text{eq 13}]$$

The equation [eq13] shows that the amplitude of the high-frequency field current Ifh includes the cosine function, i.e. $\sin(\Delta\theta)$, with the angular difference $\Delta\theta$ between the γ-axis and the d-axis as its independent variable. This enables the amplitude of the high-frequency field current Ifh to be minimized if the angular difference $\Delta\theta$ becomes zero so that $\sin(\Delta\theta)$ is equal to 0.

Figure 10A:
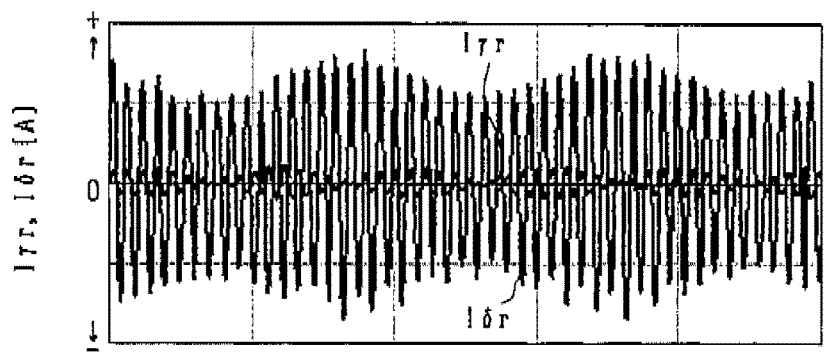
FIG. 10A is a graph schematically illustrating how each of the γ- and δ-axis currents changes with time according to the fourth embodiment.
Figure 10B:
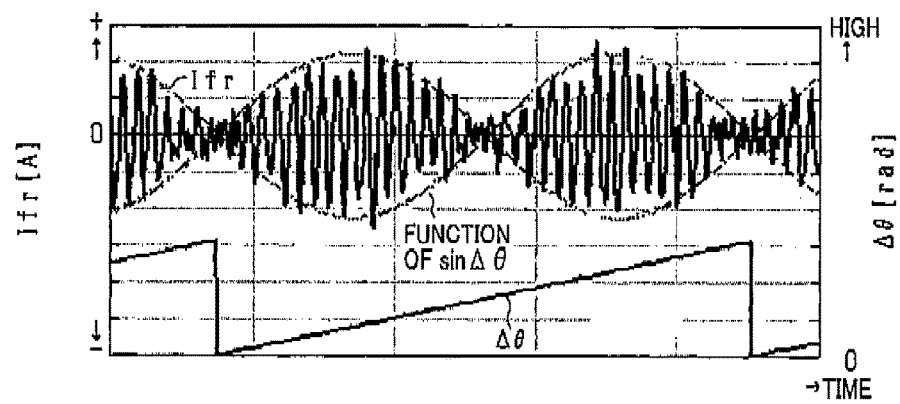
FIG. 10B is a graph schematically illustrating how each of the angular difference and the high-frequency field current changes with time according to the fourth embodiment.

FIGS. 10A and 10B illustrate that the amplitude of the high-frequency field current Ifh is minimized when the angular difference $\Delta\theta$ becomes zero. Specifically, FIG. 10A illustrates how each of the γ- and δ-axis currents Iγr and Iδr changes with time, and FIG. 10B illustrates how each of the angular difference $\Delta\theta$ and the high-frequency field current Ifh changes with time. FIG. 10B shows that the amplitude of the field current Ifr including the high-frequency field current Ifh is varied as a function of the $\sin(\Delta\theta)$.

The magnetic-pole position estimator 46 according to the fourth embodiment is configured to estimate the magnetic-pole position θγ of the rotor 11 in accordance with equation [eq13] representing that the amplitude of the high-frequency field current Ifh to be minimized if the angular difference $\Delta\theta$ becomes zero.

Specifically, the angular difference calculator 46a calculates the angular difference $\Delta\theta$ in accordance with the following equations [eq14a] and [eq14b] and the high-frequency field current Ifh extracted by the first high-frequency component extractor 44; reorganizing the equation [eq13] obtains the following equations [eq14a] and [eq14b]:

$$\sin(\Delta\theta) = -\frac{2\pi \cdot fh(L0 \cdot Lf - Mf^2)Ifh}{Mf \cdot V02 \cdot \cos(2\pi \cdot fh \cdot t)} \quad [\text{eq 14a}]$$

$$\Delta\theta = \sin^{-1}\left(-\frac{2\pi \cdot fh(L0 \cdot Lf - Mf^2)Ifh}{Mf \cdot V02 \cdot \cos(2\pi \cdot fh \cdot t)}\right) \quad [\text{eq 14b}]$$

Like the first embodiment, the angular difference corrector 46b cyclically estimates a value of the magnetic-pole position θγ of the rotor 11 according to a value of the angular difference $\Delta\theta$ cyclically calculated by the angular difference calculator 46a.

The aforementioned control device 40C according to the fourth embodiment estimates the magnetic-pole position θγ, whose value substantially matches with, i.e. follows, the actual rotational position θ of the d-axis of the rotor 11, in accordance with the high-frequency field current Ifh. Accordingly, the control device 40C achieves the same advantageous effects as the control device 40 does.

Fifth Embodiment

The following describes a control device for estimating the magnetic-pole position θγ of the rotor 11 according to the fifth embodiment of the present disclosure. The structure and/or functions of the control device according to the fifth embodiment differ from the control device 40C according to the fourth embodiment in the following points. So, the following mainly describes the different points.

The control device according to the fifth embodiment includes the magnetic-pole estimator 46A according to the second embodiment. Specifically, the magnetic-pole estimator 46A of the fifth embodiment is configured to change the magnetic-pole position θγ of the rotor 11 such that the angular difference $\Delta\theta$ converges to zero, in other words, the amplitude of the high-frequency field current Ifh is minimized.

That is, the manipulated-variable calculator 46c performs a known integral feedback operation using the calculated angular difference $\Delta\theta$ as input data and a feedback gain term Ki of a feedback control algorithm. The feedback operation calculates a value of the magnetic-pole position θγ of the rotor 11 such that the calculated angular difference $\Delta\theta$ converges to zero, which minimizes the amplitude of the high-frequency field current Ifh.

Like the control device 400C, the aforementioned control device according to the fifth embodiment estimates the magnetic-pole position θγ, whose value substantially matches with, i.e. follows, the actual rotational position θ of the d-axis of the rotor 11, in accordance with the high-frequency field current Ifh. Accordingly, the control device achieves the same advantageous effects as the control device 40C does.

Sixth Embodiment

The following describes a control device 40D for estimating the magnetic-pole position θγ of the rotor 11 according to the sixth embodiment of the present disclosure. The structure and/or functions of the control device 40D according to the sixth embodiment differ from the control device according to the fifth embodiment in the following points. So, the following mainly describes the different points.

Figure 11:
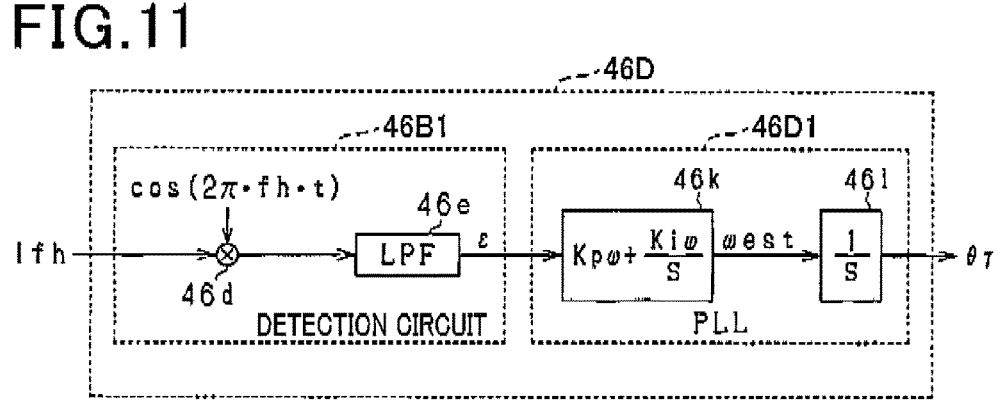
FIG. 11 is a block diagram schematically illustrating an example of the structure of a magnetic-pole position estimator of a control device according to a sixth embodiment of the present disclosure.

FIG. 11 schematically illustrates an example of the structure of a magnetic-pole position estimator 46D of the control device 40D. Functional modules of the magnetic-pole position estimator 46D, which are substantially identical to the functional modules illustrated in FIG. 8, have the same reference numerals assigned thereto as the reference numerals of the functional modules illustrated in FIG. 8.

Referring to FIG. 11, the magnetic-pole estimator 46D includes the detector circuit 46B1 and a phase-locked loop (PLL) circuit 46D1. The PLL circuit 46D1 includes a PI calculator 46k and an integrator 46l.

As described above, the detector circuit 46B1 detects the amplitude component ε(Δθ) expressed by the following equation [eq14X]:

$$\varepsilon(\Delta\theta) = \frac{-Mf \cdot V0}{2\pi \cdot fh(L0 \cdot Lf - Mf^2)} \sin(\Delta\theta) \quad [\text{eq 14X}]$$

The amplitude component ε(Δθ) is input to the PI calculator 46k.

The PI calculator 46k performs a PI operation using an angular-velocity proportional gain Kpa, an angular-velocity integration gain Kia, and the following equation [eq14Y], thus calculating an estimated value $\omega_{est}$ of the angular velocity ω of the rotor 11:

$$\omega_{est} = Kpa \cdot \varepsilon(\Delta\theta) + \frac{Kia \cdot \varepsilon(\Delta\theta)}{s} \quad [\text{eq 14Y}]$$

That is, the PI calculator 46k multiplies the amplitude component ε(Δθ) by the angular-velocity proportional gain Kpa to obtain the value Kpa·ε(Δθ), and integrates the product of the amplitude component ε(Δθ) and the angular-velocity integration gain Kiω over time to obtain a value $$\frac{Kia \cdot \varepsilon(\Delta\theta)}{s}.$$

Then, the PI calculator 46k calculates the sum of the value Kpa·ε(Δθ) and the value $$\frac{Kia \cdot \varepsilon(\Delta\theta)}{s},$$

thus calculating the estimated value $\omega_{est}$ of the angular velocity ω of the rotor 11.

The operations of the PI calculator 46k are based on the fact that the amplitude component ε(Δθ) is proportional to the angular difference Δθ if the angular difference Δθ is a value close to zero, because the amplitude component ε(Δθ) is expressed as a sinusoidal function.

The integrator 46l integrates the estimated value $\omega_{est}$ of the angular velocity ω of the rotor 11 over time, thus estimating a value of the magnetic-pole position θγ of the rotor 11 such that the calculated angular difference Δθ converges to zero, which minimizes the amplitude of the high-frequency field current Ifh.

Like the control device according to the fifth embodiment, the aforementioned control device 40D according to the sixth embodiment estimates the magnetic-pole position θγ, whose value substantially matches with, i.e. follows, the actual rotational position θ of the d-axis of the rotor 11, in accordance with the high-frequency field current Ifh. Accordingly, the control device 40D achieves the same advantageous effects as the control device according to the fifth embodiment does.

Seventh Embodiment

The following describes a control device 40E for estimating the magnetic-pole position θγ of the rotor 11 according to the seventh embodiment of the present disclosure. The structure and/or functions of the control device 40E according to the seventh embodiment differ from each of the control devices 40 and 400C in the following points. So, the following mainly describes the different points.

Figure 12:
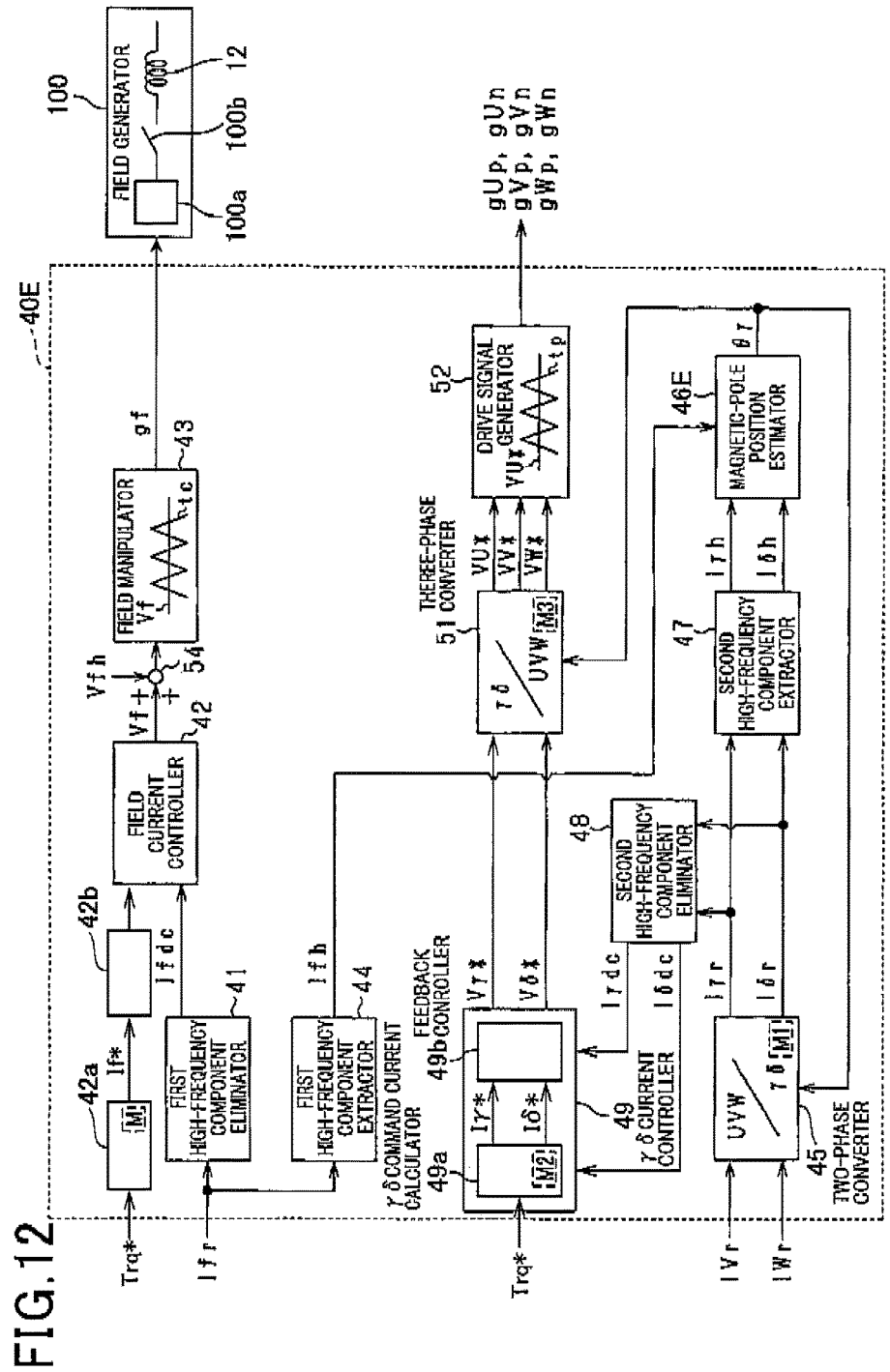
FIG. 12 is a block diagram schematically illustrating functional modules of a control device according to the seventh embodiment of the present disclosure.

FIG. 12 schematically illustrates functional modules of the control device 40E equivalent to operations to be executed by the control device 40E. The functional modules illustrated in FIG. 12, which are substantially identical to the functional modules illustrated in FIG. 2, have the same reference numerals assigned thereto as the reference numerals of the functional modules illustrated in FIG. 2.

Referring to FIG. 12, the control device 40E includes a field superimposer 54 in place of the γ-axis superimposer 50.

The field superimposer 54, which serves as, for example, a voltage applier or a voltage applying unit, generates a high-frequency field voltage Vfh having, for example, sinusoidal waveform, and superimposes the high-frequency field voltage Vfh on the field command voltage Vf output from the field current controller 42, thus generating a combined field command voltage (Vf+Vfh). Then, the field superimposer 54 outputs the combined field command voltage (Vf+Vfh) to the field manipulator 43.

The field manipulator 43 performs the PWM task that compares in amplitude the combined field command voltage (Vf+Vfh) with the cyclic carrier signal tc. Then, the PWM task generates, according to the compared results, the field drive signal gf. The field manipulator 43 outputs the field drive signal gf to the switching element of the field generator 100 to thereby control on-off operations of the switching element in accordance with the controllable duty of the field drive signal gf. This causes the field current Ifr, i.e. the field DC current Ifdc, to follow the target current If*.

Specifically, the field superimposer 54 applies the sinusoidal high-frequency field voltage Vfh to the field command voltage Vf in accordance with the following equation [eq15]:

$$\begin{bmatrix} V\gamma h \\ V\delta h \\ Vfh \end{bmatrix} = \begin{bmatrix} 0 \\ 0 \\ V0 \cdot \sin(2\pi \cdot fh \cdot t) \end{bmatrix} \quad [\text{eq 15}]$$

Applying the high-frequency field voltage Vfh to the field command voltage Vf enables a high-frequency γ-axis current Iγh to flow a high-frequency γ-axis current Iγh in the γ-axis and a high-frequency δ-axis current Iδh to flow in the δ-axis. The high-frequency γ-axis current Iγh and the high-frequency γ-axis current Iγh are respectively expressed by the following equations [eq16] and [eq17]:

$$I\gamma h = \frac{Mf \cdot V0}{2\pi \cdot fh(L0 \cdot Lf - Mf^2)} \cos(\Delta\theta) \cdot \cos(2\pi \cdot fh \cdot t) \quad [\text{eq 16}]$$

$$I\delta h = \frac{-Mf \cdot V0}{2\pi \cdot fh(L0 \cdot Lf - Mf^2)} \sin(\Delta\theta) \cdot \cos(\Delta\theta) \cdot \cos(2\pi \cdot fh \cdot t) \quad [\text{eq 17}]$$

Figure 13A:
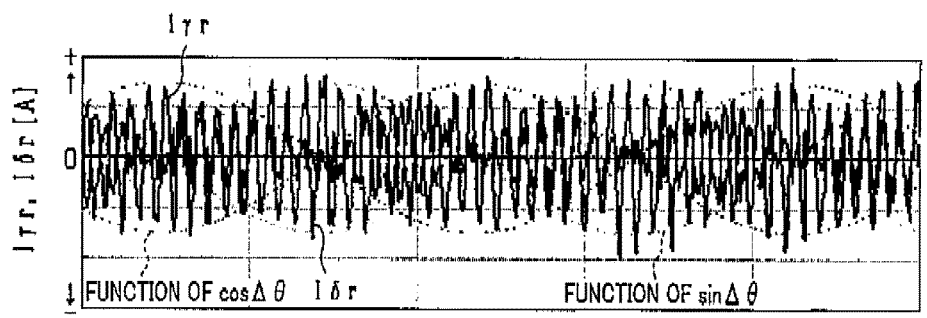
FIG. 13A is a graph schematically illustrating how each of the γ- and δ-axis currents changes with time according to the seventh embodiment.
Figure 13B:
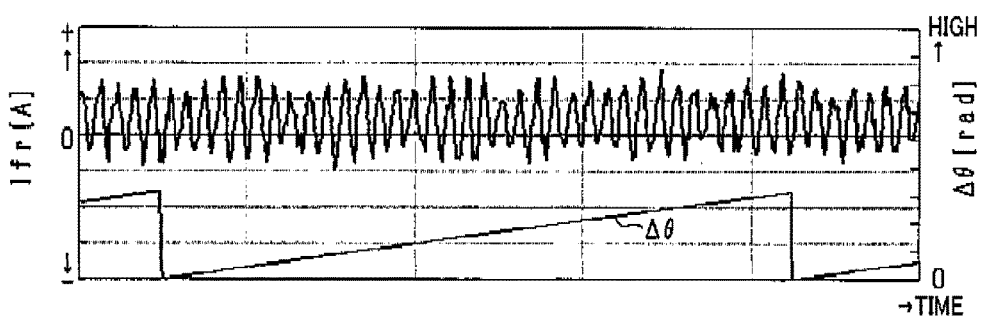
FIG. 13B is a graph schematically illustrating how each of the angular difference and the high-frequency field current changes with time according to the seventh embodiment.

FIGS. 13A and 13B, which respectively correspond to FIGS. 5A and 5B, illustrate that the amplitude of the high-frequency γ-axis current Iγh is maximized when the angular difference Δθ becomes zero, and the amplitude of the high-frequency δ-axis current Iδh is minimized when the angular difference Δθ becomes zero.

Figure 14:
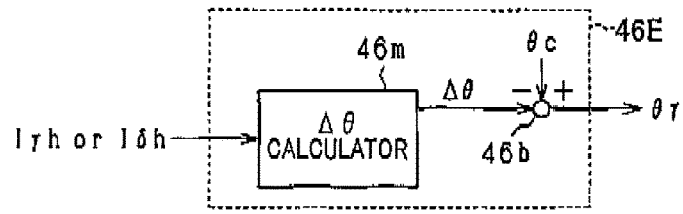
FIG. 14 is a block diagram schematically illustrating an example of the structure of a magnetic-pole position estimator of the control device according to the seventh embodiment.

A magnetic-pole position estimator 46E according to the seventh embodiment is configured to estimate the magnetic-pole position θγ of the rotor 11 in accordance with one of the high-frequency γ-axis current Iγh expressed by the equation [eq16] and the high-frequency γ-axis current Iγh expressed by the equation [eq17] with reference to FIG. 14.

Referring to FIG. 14, the magnetic-pole position estimator 46E includes an angular difference calculator 46m and the angular difference corrector 46b described in the first embodiment.

When using the high-frequency γ-axis current Iγh expressed by the equation [eq16], the angular difference calculator 46m calculates the angular difference Δθ in accordance with the following equations [eq18a] and [eq18b] and the high-frequency γ-axis current Iγh extracted by the second high-frequency component extractor 47; reorganizing the equation [eq16] obtains the following equations [eq18a] and [eq18b]:

$$\cos(\Delta\theta) = \frac{2\pi \cdot fh(L0 \cdot Lf - Mf^2)I\gamma h}{Mf \cdot V02 \cdot \cos(2\pi \cdot fh \cdot t)} \quad [\text{eq 18a}]$$

$$\Delta\theta = \cos^{-1}\left(\frac{2\pi \cdot fh(L0 \cdot Lf - Mf^2)I\gamma h}{Mf \cdot V02 \cdot \cos(2\pi \cdot fh \cdot t)}\right) \quad [\text{eq 18b}]$$

Next, when using the high-frequency δ-axis current Iδh expressed by the equation [eq17], the angular difference calculator 46m calculates the angular difference Δθ in accordance with the following equations [eq19a] and [eq19b] and the high-frequency δ-axis current Iδh extracted by the second high-frequency component extractor 47; reorganizing the equation [eq17] obtains the following equations [eq19a] and [eq19b]:

$$\sin(\Delta\theta) = -\frac{2\pi \cdot fh(L0 \cdot Lf - Mf^2)I\delta h}{Mf \cdot V02 \cdot \cos(2\pi \cdot fh \cdot t)} \quad [\text{eq 19a}]$$

$$\Delta\theta = \sin^{-1}\left(-\frac{2\pi \cdot fh(L0 \cdot Lf - Mf^2)I\delta h}{Mf \cdot V02 \cdot \cos(2\pi \cdot fh \cdot t)}\right) \quad [\text{eq 19b}]$$

Like each of the first and fourth embodiments, the angular difference corrector 46b cyclically estimates a value of the magnetic-pole position θγ of the rotor 11 according to a value of the angular difference Δθ cyclically calculated by the angular difference calculator 46m.

The aforementioned control device 40E according to the seventh embodiment estimates the magnetic-pole position θγ, whose value substantially matches with, i.e. follows, the actual rotational position θ of the d-axis of the rotor 11, in accordance with the high-frequency γ- or δ-axis current Iγh or Iδh. Accordingly, the control device 40E achieves the same advantageous effects as each of the control devices 40 and 40C does.

Additionally, the control device 40E includes the second high-frequency component extractor 47 for extracting the high-frequency γ- or δ-axis current Iγh or Iδh from the γ- or δ-axis current Iγ or Iδ. This enables estimation of the magnetic-pole position θγ, whose value substantially follows the actual rotational position θ of the d-axis of the rotor 11, even while the motor 10 is operating.

Eighth Embodiment

The following describes a control device 40F for estimating the magnetic-pole position θγ of the rotor 11 according to the eighth embodiment of the present disclosure. The structure and/or functions of the control device 40F according to the eighth embodiment differ from the control device 40E in the following points. So, the following mainly describes the different points.

Figure 15:
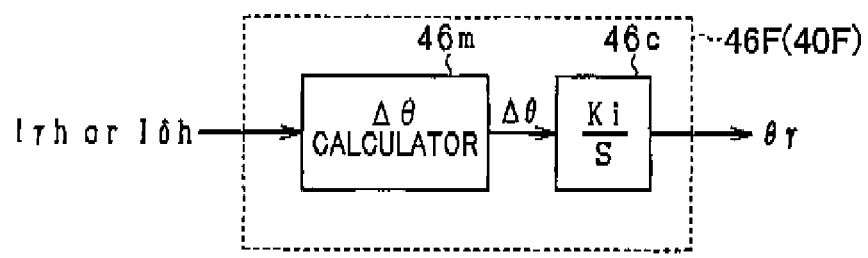
FIG. 15 is a block diagram schematically illustrating an example of the structure of a magnetic-pole position estimator of the control device according to the eighth embodiment of the present disclosure.

FIG. 15 schematically illustrates an example of the structure of a magnetic-pole estimator 46F of the control device 40F. The magnetic-pole estimator 46F of the eighth embodiment is configured to change the magnetic-pole position θγ of the rotor 11 such that the angular difference Δθ converges to zero, in other words, the amplitude of the high-frequency γ-axis current Iγh, which flows in the γ-axis based on application of the high-frequency field current Ifh, is maximized. The magnetic-pole estimator 46F of the eighth embodiment is configured to change the magnetic-pole position θγ of the rotor 11 such that the angular difference Δθ converges to zero, in other words, the amplitude of the high-frequency δ-axis current Iδh, which flows in the δ-axis based on application of the high-frequency field current Ifh, is minimized.

Referring to FIG. 15, the magnetic-pole estimator 46F includes the angular difference calculator 46m, and the manipulated-variable calculator 46c set forth above.

Specifically, when using the high-frequency γ-axis current Iγh, the manipulated-variable calculator 46c performs a known integral feedback operation using the calculated angular difference Δθ as input data and a feedback gain term Ki of a feedback control algorithm. The feedback operation calculates a value of the magnetic-pole position θγ of the rotor 11 such that the calculated angular difference Δθ converges to zero, which maximizes the amplitude of the high-frequency γ-axis current Iγh.

Additionally, when using the high-frequency δ-axis current Iδh, the manipulated-variable calculator 46c performs a known integral feedback operation using the calculated angular difference Δθ as input data and a feedback gain term Ki of a feedback control algorithm. The feedback operation calculates a value of the magnetic-pole position θγ of the rotor 11 such that the calculated angular difference Δθ converges to zero, which minimizes the amplitude of the high-frequency δ-axis current Iδh.

Like the control device 40E, the aforementioned control device 40F according to the eighth embodiment estimates the magnetic-pole position θγ, whose value substantially matches with, i.e. follows, the actual rotational position θ of the d-axis of the rotor 11, in accordance with the high-frequency γ- or δ-axis current Iγh or Iδh. Accordingly, the control device 40F achieves the same advantageous effects as the control device 40E does.

Ninth Embodiment

The following describes a control device 40G for estimating the magnetic-pole position θγ of the rotor 11 according to the ninth embodiment of the present disclosure. The structure and/or functions of the control device 40G according to the ninth embodiment differ from the control device 40E in the following points. So, the following mainly describes the different points.

Figure 16:
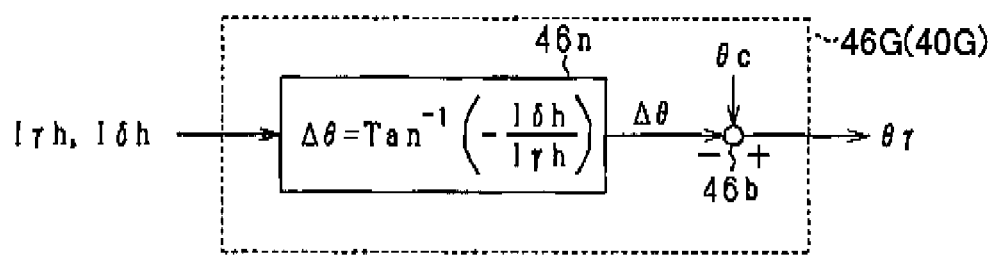
FIG. 16 is a block diagram schematically illustrating an example of the structure of a magnetic-pole position estimator of a control device according to the ninth embodiment of the present disclosure.

Referring to FIG. 16, a magnetic-pole position estimator 46G includes an angular difference calculator 46n and the angular difference corrector 46b described in the first embodiment.

The angular difference calculator 46n calculates the angular difference $\Delta\theta$ based on both the high-frequency $\gamma$-axis current I$\gamma$h expressed by the equation [eq16] and the high-frequency $\gamma$-axis current I$\gamma$h expressed by the equation [eq17].

Specifically, the angular difference calculator 46n calculates, based on the high-frequency $\gamma$- and $\delta$-axis currents I$\gamma$h and I$\delta$h extracted by the second high-frequency component extractor 47, the angular difference $\Delta\theta$ in accordance with the following equation [eq20]:

$$\Delta\theta = \tan^{-1}\left(-\frac{I\delta h}{I\gamma h}\right) \quad [\text{eq 20}]$$

Note that the angular difference calculator 46n calculates the angular difference $\Delta\theta$ with the range from $$-\frac{\pi}{2}$$

exclusive to $$\frac{\pi}{2}$$

exclusive.

Like the control device 40E, the aforementioned control device 40G according to the ninth embodiment estimates the magnetic-pole position $\theta\gamma$, whose value substantially matches with, i.e. follows, the actual rotational position $\theta$ of the d-axis of the rotor 11, in accordance with both the high-frequency $\gamma$- and $\delta$-axis currents I$\gamma$h and I$\delta$h. Accordingly, the control device 40F achieves the same advantageous effects as the control device 40E does.

Tenth Embodiment

The following describes a control device for estimating the magnetic-pole position $\theta\gamma$ of the rotor 11 according to the tenth embodiment of the present disclosure. The structure and/or functions of the control device according to the tenth embodiment differ from each of the control devices 40, 40C, and 40E in the following points. So, the following mainly describes the different points.

The control device according to the tenth embodiment includes no superimposes 50, 53, and 54 respectively illustrated in FIGS. 2, 9, and 12. In particular, the field manipulator 43 of the control device according to the tenth embodiment performs the PWM task that compares in amplitude the field command voltage Vf with the cyclic carrier signal tc.

Figure 17A:
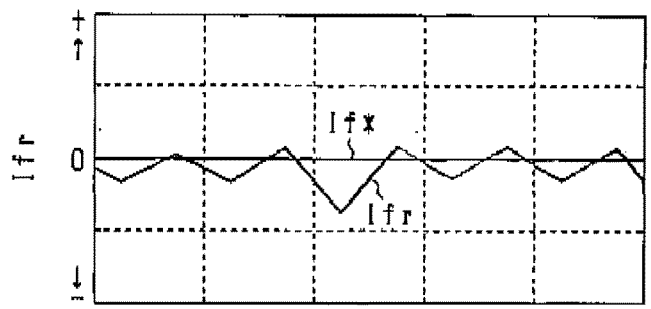
FIG. 17A is a graph schematically illustrating how each of the high-frequency field current and a target current therefore changes with time according to the tenth embodiment of the present disclosure.
Figure 17B:
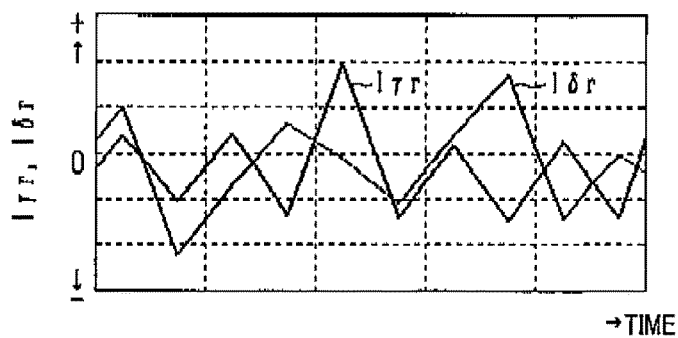
FIG. 17B is a graph schematically illustrating each of the γ- and δ-axis currents changes with time according to the tenth embodiment.

Then, the PWM task generates, according to the compared results, the field drive signal gf for each switching cycle matching with the cycle of the carrier tc. The field manipulator 43 outputs the field drive signal gf to the switching element of the field generator 100 to thereby control on-off operations of the switching element 100b in accordance with the controllable duty of the field drive signal gf. This causes the high-frequency field voltage Vfh to be superimposed on the field current Ifr, i.e. the field DC current Ifdc. This causes the high-frequency field current Ifh to be superimposed on the field current Ifr, i.e. the field DC current Ifdc (see FIG. 17A). That is, the field manipulator 43 serves as, for example, a voltage applier for applying the high-frequency field voltage Vfh on the field current If.

The high-frequency current Ifh flowing through the field winding 12 causes the high-frequency $\gamma$-axis current I$\gamma$h to flow in the $\gamma$-axis and the high-frequency $\delta$-axis current I$\delta$h to flow in the $\delta$-axis.

Thus, the magnetic-pole position estimator 46 according to the tenth embodiment enables the magnetic-pole position $\theta\gamma$, whose value substantially matches with, i.e. follows, the actual rotational position $\theta$ of the d-axis of the rotor 11, to be estimated in accordance with at least one of the high-frequency $\gamma$- and $\delta$-axis currents I$\gamma$h and I$\delta$h using one of the estimation methods described in the seventh to ninth embodiments.

Eleventh Embodiment

The following describes a control device 40H for estimating the magnetic-pole position $\theta\gamma$ of the rotor 11 according to the eleventh embodiment of the present disclosure. The structure and/or functions of the control device according to the eleventh embodiment differ from each of the control devices according to the aforementioned first to tenth embodiments in the following points. So, the following mainly describes the different points.

A magnetic-pole position estimator 46H of the control device 40H according to the eleventh embodiment is configured to determine whether the angular difference $\Delta\theta$ is located in one of the first to fourth angular regions in one electrical-angular period, i.e. $2\pi$, of the rotor 11; dividing one electrical-angular period equally into the first to fourth angular regions. Then, the magnetic-pole position estimator 46H corrects the estimated angular difference $\Delta\theta$ according to the determination results.

Figure 18:
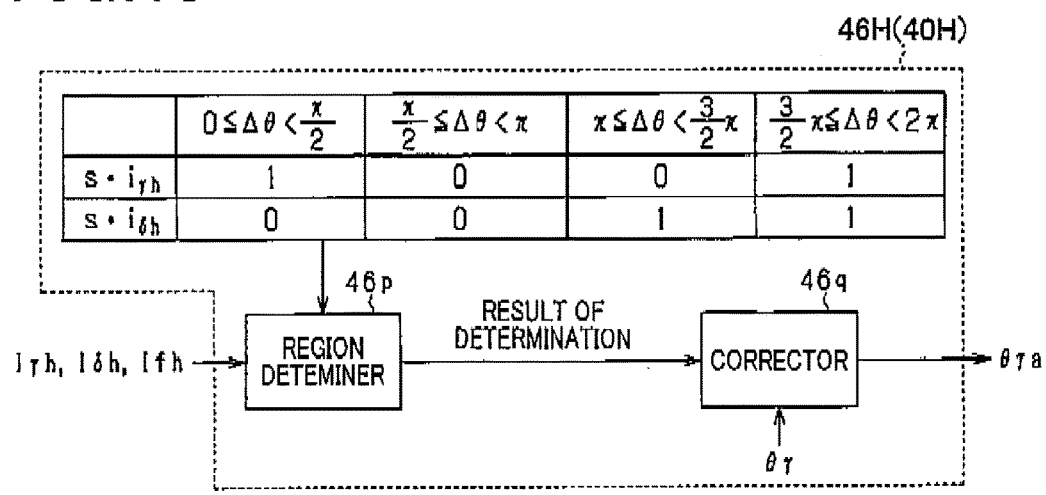
FIG. 18 is a block diagram schematically illustrating an example of the structure of a magnetic-pole position estimator of a control device according to the eleventh embodiment of the present disclosure.

Referring to FIG. 18, the magnetic-pole position estimator 46H includes a region determiner 46p and a corrector 46q. The magnetic-pole position estimator 46H can estimate a value of the magnetic-pole position $\theta\gamma$ of the rotor 11 according to one of the first to tenth embodiments set forth above.

The region determiner 46p determines that the actual angular difference $\Delta\theta$ is located within which of the first to fourth angular regions according to the polarity of the instantaneous change of each of the $\gamma$-axis current I$\gamma$r, the $\delta$-axis current I$\delta$r, and the field current Ifr. The first angular region is defined as $0 \leq \theta < \pi/2$, the second angular region is defined as $\pi/2 \leq \theta < \pi$, the third angular region is defined as $\pi \leq \theta < 3\pi/2$, and the fourth angular region is defined as $3\pi/2 \leq \theta < 2\pi$, i.e. 0. The instantaneous change of the $\gamma$-axis current I$\gamma$r is represented as s·I$\gamma$r, in other words, $$\frac{dI\gamma r}{dt},$$

and the instantaneous change of the $\delta$-axis current I$\delta$r is represented as s·I$\delta$r, in other words, $$\frac{dI\delta r}{dt}.$$

In addition, the instantaneous change of the field current Ifr is represented as s·Ifr, in other words, $$\frac{dIfr}{dt}.$$

Figures 19A, 19B:
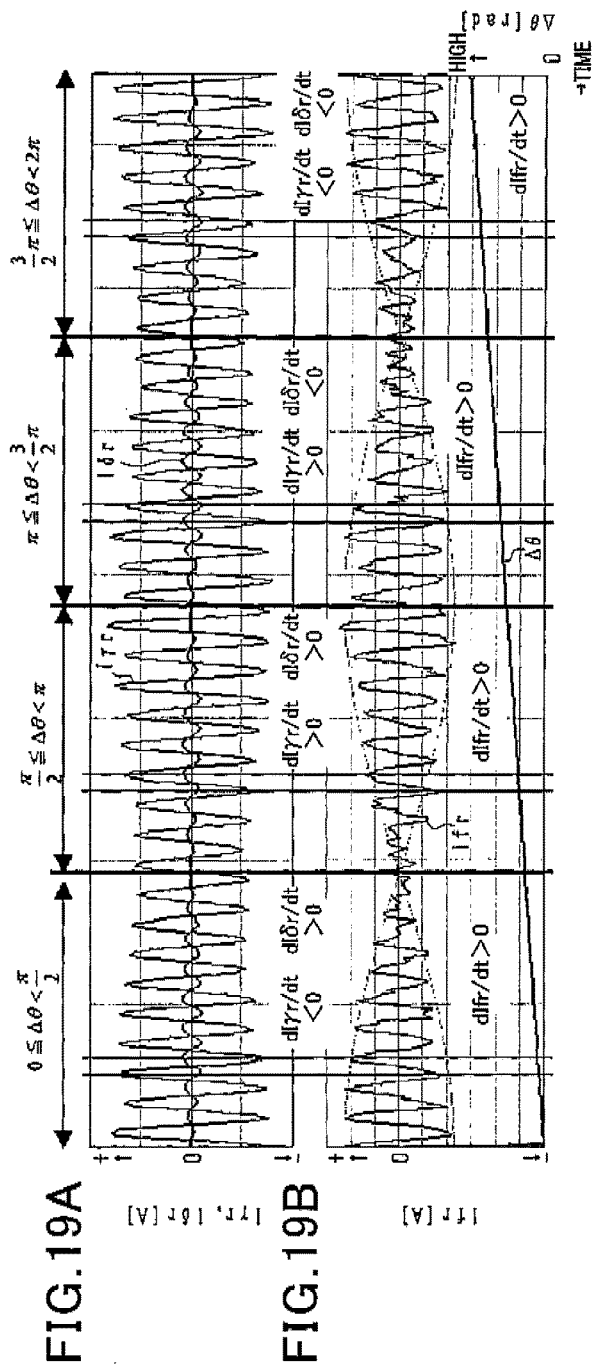
FIG. 19A is a graph schematically illustrating that the polarities of instantaneous changes of the γ-axis current and the δ-axis current have correlations with respect to each of first to fourth angular region according to the eleventh embodiment.
FIG. 19B is a graph schematically illustrating that the polarity of instantaneous change of the field current has a correlation with respect to each of first to fourth angular region according to the eleventh embodiment.

This is based on the fact that the polarities of the instantaneous changes $$\frac{dI\gamma r}{dt}, \frac{dI\delta r}{dt}, \text{ and } \frac{dIfr}{dt}$$

have unique correlations with respect to each of the first to fourth angular regions (see FIG. 19).

FIG. 18 schematically illustrates information T having, for example, a table format. The information T includes a relationship between each of the first to fourth angular regions and the polarities of the instantaneous changes s·Iγr of the γ-axis current Iγr, the instantaneous change s·Iδr of the δ-axis current Iδr, and the instantaneous change s·Ifr of the field current Ifr.

Specifically, if the polarity of the instantaneous change s·Iγr of the γ-axis current Iγr differs from the polarity of the instantaneous change s·Ifr of the field current Ifr, this is represented as a binary bit 1 in the information T. Similarly, if the polarity of the instantaneous change s·Iδr of the δ-axis current Iδr differ from the polarity of the instantaneous change s·Ifr of the field current Ifr, this is represented as a binary bit 1 in the information T.

In contrast, if the polarity of the instantaneous change s·Iγr of the γ-axis current Iγr is equal to the polarity of the instantaneous change s·Ifr of the field current Ifr, this is represented as a binary bit 0 in the information T. Similarly, if the polarity of the instantaneous change s·Iδr of the δ-axis current Iδr is equal to the polarity of the instantaneous change s·Ifr of the field current Ifr, this is represented as a binary bit 0 in the information T.

For example, if the polarity of each of the instantaneous changes s·Iγr and s·Ifr is equal to the polarity of the instantaneous change s·Ifr of the field current Ifr, which is represented as the binary bit 0 in the information T, the region determiner 46p determines that the actual angular difference Δθ is located within the second angular region (π/2≤θ<π).

The following equations [eq21], [eq22], and [eq23] enable the relationships between the polarities of the instantaneous changes s·Iγr of the γ-axis current Iγr, the instantaneous change s·Iδr of the δ-axis current Iδr, and the instantaneous change s·Ifr of the field current Ifr to be derived if the applied high-frequency voltage is represented as Vh:

$$s \cdot I\gamma h = \left\{ \frac{1}{L0} \cdot \frac{Mf^2}{2L0(L0 \cdot Lf - Mf^2)}(1 - \cos(2\Delta\theta)) \right\} Vh \quad [eq\ 21]$$

$$s \cdot I\delta h = -\frac{Mf^2}{2L0(L0 \cdot Lf - Mf^2)} \sin(2\Delta\theta) \cdot Vh \quad [eq\ 22]$$

$$s \cdot Ifh = -\frac{Mf}{L0 \cdot Lf - Mf^2} \cos(2\Delta\theta) \cdot Vh \quad [eq\ 23]$$

As described above, calculating the temporal differentiation $$\frac{dI\gamma r}{dt}$$

of the γ-axis current Iγr, temporal differentiation $$\frac{dI\delta r}{dt}$$

of the δ-axis current Iδr, and the temporal differentiation $$\frac{dIfr}{dt}$$

of the field current Ifh enables the polarities of the instantaneous changes of the respective the γ-axis current Iγr, the δ-axis current Iδr, and the field current Ifr to be obtained.

The corrector 46q corrects the angular difference Δθ estimated by the magnetic-pole position estimator 46H according to the determination results of the region determiner 46p.

That is, the magnetic-pole position estimator 46H estimates the angular difference Δθ within the angular range defined as 0≤≥<π/2. At that time, for example, the equation sin(Δθ)=zero is satisfied when the angular difference Δθ has zero or η. That is, when the angular difference Δθ has π so that the equation sin(Δθ)=zero, the estimated value of the magnetic-pole position θγ of the rotor 11 may deviate from zero.

In view of these circumstances, the corrector 46q reduces the electrical angle π from the estimated value of the magnetic-pole position θγ of the rotor 11 when the region determiner 46p determines that the actual angular difference Δθ is located within the second angular region π/2≤θ<π or the third angular region π≤θ<3π/2. This calculates a corrected magnetic-pole position θγa of the rotor 11.

Additionally, the corrector 46q calculates the estimated value of the magnetic-pole position θγ of the rotor 11 as the corrected magnetic-pole position θγa of the rotor 11 when the region determiner 46p determines that the actual angular difference Δθ is located within the first angular region 0≤θ<π/2 or the fourth angular region 3π/2≤θ<2π. The corrected magnetic-pole position θγa of the rotor 11 is sent to each of the two-phase converter 45 and the three-phase converter 51 to be used as the magnetic-pole position θγ of the rotor 11.

The control device 40H according to the eleventh embodiment estimates the magnetic-pole position θγ, whose value substantially matches with, i.e. follows, the actual rotational position θ of the d-axis of the rotor 11, Accordingly, the control device 40H achieves the same advantageous effects as the control device 40 does.

Additionally, the control device 40H according to the eleventh embodiment prevents the corrected magnetic-pole position θγa of the rotor 11 from deviating from zero even if the actual angular difference Δθ is located within the second angular region π/2≤θ<π or the third angular region π≤θ<3π/2. This therefore improves the accuracy of estimating the magnetic-pole position of the rotor 11.

The present invention is not limited to the embodiments set forth above, and can be widely modified within the scope of the present disclosure.

The detector circuit 46B1 of each of the magnetic-pole estimators 46B and 46D is configured such that the high-frequency field current Ifh is input thereto and the detector circuit 46B1 uses the high-frequency field current Ifh input thereto. The detector circuit 46B1 of each of the magnetic-pole estimators 46B and 46D however can be configured such that the high-frequency γ-axis current Iγr or the high-frequency δ-axis current Iδr is input thereto and the detector circuit 46B1 uses the high-frequency γ-axis current Iγr or high-frequency δ-axis current Iδr input thereto.

The control device 40H according to the eleventh embodiment performs the determination task and the correction task when the high-frequency γ-axis voltage Vγh is superimposed on the γ-axis command voltage Vγ*, but the present disclosure is not limited thereto. Specifically, the control device 40H according to the eleventh embodiment can perform the determination task and the correction task when the high-frequency δ-axis voltage Vδh is superimposed on the δ-axis command voltage Vδ* or the high-frequency field voltage Vfh is superimposed on the field command voltage Vf output from the field current controller 42.

Each of the control devices according to the first to eleventh embodiments applies a sinusoidal high-frequency voltage to the γ-axis command voltage Vγ*, the δ-axis command voltage Vδ*, or the field command voltage Vf, but the present disclosure is not limited thereto. Specifically, each of the control devices according to the first to eleventh embodiments can apply a cyclic high-frequency voltage, such as a pulsed high-frequency voltage, to the γ-axis command voltage Vγ*, the δ-axis command voltage Vδ*, or the field command voltage Vf.

Each of aforementioned embodiments of the present disclosure uses a non-salient pole motor as a rotary electric machine, but can use a salient-pole motor. Each of the aforementioned embodiments of the present disclosure can use a rotary electric machine operative to generate drive torque, to generate electrical power, or generate both drive torque and electrical power.

While illustrative embodiments of the present disclosure have been described herein, the present disclosure is not limited to the embodiments described herein, but includes any and all embodiments having modifications, omissions, combinations (e.g., of aspects across various embodiments), adaptations and/or alternations as would be appreciated by those in the art based on the present disclosure. The limitations in the claims are to be interpreted broadly based on the language employed in the claims and not limited to examples described in the present specification or during the prosecution of the application, which examples are to be construed as non-exclusive.

What is claimed is:

1. An apparatus for controlling a rotary electric machine including a rotor with a field winding for generating at least one pair of magnetic poles, and a stator with an armature winding, the field winding and the armature winding being magnetically coupled to each other when energized, the apparatus comprising:

a voltage applier that applies a high-frequency voltage to one of the field winding and the armature winding, the one of the field winding and the armature winding being defined as an input winding, and the other thereof being defined as an output winding;

a current detector that detects a high-frequency current flowing through the output winding based on the applied high-frequency voltage, the high-frequency current including therein information associated with the rotational position of a target magnetic pole of the rotor as a predetermined one of the magnetic poles; and an estimator that estimates the rotational position of the target magnetic pole of the rotor according to the high-frequency current detected by the current detector.

2. The apparatus according to claim 1, wherein the armature winding is defined as the input winding, and the field winding is defined as the output winding.

3. The apparatus according to claim 2, wherein:

the apparatus has a target direction of the target magnetic pole, an estimated first direction for the target direction of the target magnetic pole, and an estimated second direction electromagnetically perpendicular to the estimated first direction;

the voltage applier applies the high-frequency voltage to the armature winding as a component in the estimated first direction; and the estimator adjusts the estimated first direction for the target direction of the target magnetic pole such that an amplitude of the high-frequency current detected by the current detector is maximized, thus estimating the adjusted estimated first direction as the rotational position of the target magnetic pole.

4. The apparatus according to claim 2, wherein:

the apparatus has a target direction of the target magnetic pole, an estimated first direction for the target direction of the target magnetic pole, and an estimated second direction electromagnetically perpendicular to the estimated first direction;

the voltage applier applies the high-frequency voltage to the armature winding as a component in the estimated first direction; and the estimator further comprises:

an angular difference calculator that calculates an angular difference between the target direction of the target magnetic pole and the estimated first direction in accordance with an equation that represents the amplitude of the high-frequency current detected by the current detector is maximized upon the angular difference being zero, the estimator being configured to correct the estimated first direction according to the angular difference, thus estimating the rotational position of the target magnetic pole.

5. The apparatus according to claim 2, wherein:

the apparatus has a target direction of the target magnetic pole, an estimated first direction for the target direction of the target magnetic pole, and an estimated second direction electromagnetically perpendicular to the estimated first direction;

the voltage applier applies the high-frequency voltage to the armature winding as a component in the estimated first direction; and the estimator adjusts the estimated second direction for the target direction of the target magnetic pole such that an amplitude of the high-frequency current detected by the current detector is minimized, thus estimating the adjusted estimated second direction as the rotational position of the target magnetic pole.

6. The apparatus according to claim 2, wherein:

the apparatus has a target direction of the target magnetic pole, an estimated first direction for the target direction of the target magnetic pole, and an estimated second direction electromagnetically perpendicular to the estimated first direction;

the voltage applier applies the high-frequency voltage to the armature winding as a component in the estimated first direction; and the estimator further comprises:
an angular difference calculator that calculates an angular difference between the target direction of the target magnetic pole and the estimated first direction in accordance with an equation that represents the amplitude of the high-frequency current detected by the current detector is minimized upon the angular difference being zero, the estimator being configured to correct the estimated first direction according to the angular difference, thus estimating the rotational position of the target magnetic pole.

7. The apparatus according to claim 1, wherein the field winding is defined as the input winding, and the armature winding is defined as the output winding.

8. The apparatus according to claim 7, wherein:
the apparatus has a target direction of the target magnetic pole, an estimated first direction for the target direction of the target magnetic pole, and an estimated second direction electromagnetically perpendicular to the estimated first direction;
the current detector detects a component of the high-frequency current flowing in the estimated first direction; and
the estimator adjusts the estimated first direction for the target direction of the target magnetic pole such that an amplitude of the component of the high-frequency current detected by the current detector is maximized, thus estimating the adjusted estimated first direction as the rotational position of the target magnetic pole.

9. The apparatus according to claim 7, wherein:
the apparatus has a target direction of the target magnetic pole, an estimated first direction for the target direction of the target magnetic pole, and an estimated second direction electromagnetically perpendicular to the estimated first direction;
the current detector detects a component of the high-frequency current flowing in the estimated second direction; and
the estimator adjusts the estimated first direction for the target direction of the target magnetic pole such that an amplitude of the component of the high-frequency current detected by the current detector is minimized, thus estimating the adjusted estimated first direction as the rotational position of the target magnetic pole.

10. The apparatus according to claim 7, wherein:
the apparatus has a target direction of the target magnetic pole, an estimated first direction for the target direction of the target magnetic pole, and an estimated second direction electromagnetically perpendicular to the estimated first direction;
the current detector detects a first component of the high-frequency current flowing in the estimated first direction, and detects a second component of the high-frequency current flowing in the estimated second direction; and
the estimator estimates the rotational position of the target magnetic pole of the rotor according to the first and second components of the high-frequency current detected by the current detector.

11. The apparatus according to claim 7, wherein:
the apparatus has a target direction of the target magnetic pole, an estimated first direction for the target direction of the target magnetic pole, and an estimated second direction electromagnetically perpendicular to the estimated first direction, the apparatus further comprising:
a DC power source;
a switch connected between the field winding and the DC power source;
a field voltage determiner that determines a field command voltage for the field winding; and
a field manipulator that:
performs a pulse-width modulation task that compares in amplitude the field command voltage with a cyclic carrier signal to obtain a pulse drive signal with a controllable duty; and
controls on-off operations of the switch according to the pulse drive signal, thus controlling a value of a field current flowing through the field winding to a target current value, the current detector being configured to detect at least one of a first component of the high-frequency current flowing in the estimated first direction and a second component of the high-frequency current flowing in the estimated second direction, the estimator being configured to estimate the rotational position of the target magnetic pole of the rotor according to at least one of the first and second components of the high-frequency current detected by the current detector.

12. The apparatus according to claim 1, wherein:
the apparatus has a target direction of the target magnetic pole, an estimated first direction for the target direction of the target magnetic pole, and an estimated second direction electromagnetically perpendicular to the estimated first direction, the apparatus further comprising:
a determiner that determines, according to a polarity of change of each of a first current, a second current, and a field current, that an angular difference between the target direction of the target magnetic pole and the estimated first direction is actually located within which of first, second, third, and fourth angular regions, the first current flowing in the estimated first direction, the second current flowing in the estimated second direction, the field current flowing in the field winding, one electrical angular period of the rotor being divided equally into the first, second, third, and fourth angular regions.

13. The apparatus according to claim 12, further comprising:
a corrector that corrects the rotational position of the target magnetic pole of the rotor according to a result of the determination by the determiner.

14. The apparatus according to claim 12, wherein the rotary electric machine is a non-salient pole rotary electric machine.

* * * * *